US007616608B2

(12) United States Patent
Sudo

(10) Patent No.: US 7,616,608 B2
(45) Date of Patent: Nov. 10, 2009

(54) OFDM-CDMA TRANSMISSION DEVICE AND OFDM-CDMA TRANSMISSION METHOD

(75) Inventor: Hiroaki Sudo, Yokohama (JP)

(73) Assignee: Panasonic Corporation, Osaka (JP)

( * ) Notice: Subject to any disclaimer, the term of this patent is extended or adjusted under 35 U.S.C. 154(b) by 505 days.

(21) Appl. No.: 10/502,091

(22) PCT Filed: Aug. 11, 2003

(86) PCT No.: PCT/JP03/10202

§ 371 (c)(1),
(2), (4) Date: Jul. 22, 2004

(87) PCT Pub. No.: WO2004/019532

PCT Pub. Date: Mar. 4, 2004

(65) Prior Publication Data

US 2005/0163082 A1    Jul. 28, 2005

(30) Foreign Application Priority Data

Aug. 23, 2002   (JP) ............................. 2002-244309
Aug. 23, 2002   (JP) ............................. 2002-244310

(51) Int. Cl.
*H04B 7/216*   (2006.01)
*H04B 7/208*   (2006.01)
*H04J 3/00*    (2006.01)

(52) U.S. Cl. ........................ 370/335; 370/344; 370/345

(58) Field of Classification Search ................. 370/335, 370/342, 503, 344, 436, 482, 343, 345; 455/504–506, 455/45, 112; 375/260
See application file for complete search history.

(56) References Cited

U.S. PATENT DOCUMENTS

| 5,504,775 | A |   | 4/1996  | Chouly et al. |
|-----------|---|---|---------|---------------|
| 5,831,978 | A | * | 11/1998 | Willars et al. ............... 370/335 |
| 5,903,556 | A |   | 5/1999  | Matui |
| 6,009,090 | A | * | 12/1999 | Oishi et al. .................. 370/342 |

(Continued)

FOREIGN PATENT DOCUMENTS

JP              09153843         6/1997

(Continued)

OTHER PUBLICATIONS

PCT International Search Report dated Nov. 18, 2003.

(Continued)

*Primary Examiner*—George Eng
*Assistant Examiner*—Christopher M Brandt
(74) *Attorney, Agent, or Firm*—Dickson Wright PLLC

(57) ABSTRACT

The number of multiplexing of individual transmit symbols is selected by means of selection sections B1 through B5. The number of spread signals selected by selection sections B1 through B5 are multiplexed adders C1 through C5. By this means, it is possible to select inter-code interference in code division multiplexed signal transmission on a symbol-by-symbol basis, enabling error rate characteristic quality to be selected on a symbol-by-symbol basis. As a result, if a symbol for which the number of multiplexing is reduced and error rate characteristics are made good is selected as appropriate, error rate characteristics can be improved without degrading frequency characteristics so much.

14 Claims, 17 Drawing Sheets

RELATED ART

U.S. PATENT DOCUMENTS

| | | | |
|---|---|---|---|
| 6,275,545 B1 * | 8/2001 | Suzuki | 375/343 |
| 6,373,861 B1 * | 4/2002 | Lee | 370/503 |
| 6,456,607 B2 * | 9/2002 | Arai et al. | 370/335 |
| 7,154,915 B1 * | 12/2006 | Ushirokawa et al. | 370/528 |
| 2001/0014091 A1 | 8/2001 | Yamada et al. | |
| 2001/0021182 A1 * | 9/2001 | Wakutsu | 370/344 |
| 2001/0040882 A1 * | 11/2001 | Ichiyoshi | 370/342 |
| 2002/0015438 A1 | 2/2002 | Ishizu et al. | |
| 2002/0060997 A1 * | 5/2002 | Hwang | 370/335 |
| 2002/0118659 A1 * | 8/2002 | Sakoda et al. | 370/329 |
| 2003/0012126 A1 * | 1/2003 | Sudo | 370/203 |
| 2003/0081538 A1 * | 5/2003 | Walton et al. | 370/206 |
| 2003/0112744 A1 * | 6/2003 | Baum et al. | 370/206 |
| 2003/0142655 A1 * | 7/2003 | Higuchi et al. | 370/342 |

FOREIGN PATENT DOCUMENTS

| | | |
|---|---|---|
| JP | 10126381 | 5/1998 |
| JP | 10-233758 | 9/1998 |
| JP | 11177528 | 7/1999 |
| JP | 2001044969 | 2/2001 |
| JP | 2001156744 | 6/2001 |
| JP | 2002050984 | 2/2002 |
| JP | 2002-124895 | 4/2002 |
| JP | 2002111626 | 4/2002 |
| JP | 2002164864 | 6/2002 |
| WO | 0209334 | 1/2002 |

OTHER PUBLICATIONS

Japanese Office Action dated Jan. 15, 2008 with English Translation thereof.

* cited by examiner

OFDM-CDMA TRANSMISSION DEVICE AND OFDM-CDMA TRANSMISSION METHOD

TECHNICAL FIELD

The present invention is applicable to an OFDM-CDMA transmitting apparatus whereby transmit symbols are spread and spread chips are assigned to mutually orthogonal subcarriers and undergo radio transmission, or CDMA transmitting apparatus.

BACKGROUND ART

Conventionally, in a CDMA radio transmitting apparatus or OFDM-CDMA radio transmitting apparatus, a plurality of transmit symbols are placed in the same frequency band by code division multiplexing of transmit symbols. By using spreading codes that have a mutually orthogonal relationship, the multiplexed plurality of symbols can be separated and reconstructed on the receiving side.

With OFDM-CDMA, in particular, effective use of the advantage of resistance to multipath interference obtained by means of OFDM modulation, and the advantage of excellent noise and interference tolerance obtained by means of CDMA modulation, enables high-quality transmit data to be transmitted at high speed to a large number of communication terminals.

OFDM-CDMA methods broadly comprise a time domain spreading method and a frequency domain spreading method. With the time domain spreading method, spread data that have been spread on a chip-by-chip basis by means of a spreading code are arranged in the time direction within the same subcarrier. With the frequency domain spreading method, on the other hand, spread data that have been spread on a chip-by-chip basis are assigned to different subcarriers.

A sample configuration of a conventional OFDM-CDMA communication apparatus is shown in FIG. 1. First, transmitting system 2 of OFDM-CDMA communication apparatus 1 will be described. In OFDM-CDMA communication apparatus 1, a plurality of transmit signals 1 through k, . . . , (4k+1) through 5k are input to spreaders A1 through A(5k) that perform spreading on a chip-by-chip basis using different spreading codes. The spread signals are added by adders C1 through C5, as a result of which code division multiplexed signals are obtained. In the case shown in FIG. 1, post-spreading signals corresponding to k transmit signals are multiplexed by each of adders C1 through C5.

The code division multiplexed signals output from adders C1 through C5 undergo parallel/serial conversion by a parallel/serial converter (P/S) 4, and then undergo orthogonal frequency division multiplexing by means of inverse fast Fourier transform processing by an inverse fast Fourier transform circuit (IFFT) 5. By this means, an OFDM-CDMA signal is formed in which spread chips are distributed among a plurality of subcarriers that have a mutually orthogonal relationship, and this OFDM-CDMA signal is transmitted via a radio transmitting section (RF) 10 that performs radio transmission processing such as digital-analog conversion processing and signal amplification, and an antenna AN.

Next, receiving system 3 of OFDM-CDMA communication apparatus 1 will be described. In OFDM-CDMA communication apparatus 1, an OFDM-CDMA signal transmitted from an OFDM-CDMA communication apparatus with a similar configuration is input to a fast Fourier transform circuit (FFT) 6 via an antenna AN and a radio receiving section (RF) 11 that performs radio reception processing such as analog-digital conversion processing. FFT 6 executes fast Fourier transform processing on the input signal, and thereby obtains a code division multiplexed signal transmitted by the respective subcarriers.

A propagation path compensation circuit 7 compensates for phase fluctuations, etc., occurring in the propagation path, based on a known signal such as a propagation path estimation preamble included in the signal. After propagation path compensation, the signal is despread by a despreader 8, and the received signal for that station is extracted from the plurality of transmit signals.

FIG. 2 shows the arrangement of OFDM-CDMA signals formed by conventional OFDM-CDMA communication apparatus 1. Assuming that the number of transmit signals is 5k and the spreading ratio is m, the number of subcarriers required is the same as spreading ratio m. The following signals are allocated to the subcarriers: namely, the first spread signal (chip) among the signals in which transmit signals 1 through k are multiplexed is allocated to first subcarrier #1, the second spread signal (chip) among the signals in which transmit signals 1 through k are multiplexed is allocated to the second subcarrier, and so on through to the m'th spread signal among the signals in which transmit signals (4k+5) through 5k are multiplexed, which is allocated to the 5m'th subcarrier #5m.

The number of subcarriers need not coincide with the spreading ratio. Here, a case has been illustrated in which spreading ratio m is made ⅕ the number of subcarriers, but it goes without saying that the spreading ratio is not limited to this case, and may be set arbitrarily.

In a CDMA or OFDM-CDMA communication apparatus, it is necessary to increase the number of signal multiplexing in order to improve spectral efficiency. However, in a multipath environment, for instance, orthogonality between spreading codes is lost and error rate characteristics degrade.

As the number of signal multiplexing is increased, in particular, interference between spreading codes also increases, resulting in greater degradation of error rate characteristics. Thus, a problem with communication apparatuses that use conventional code division multiplexing is the difficulty of making spectral efficiency compatible with error rate characteristics. This also applies to CDMA communication apparatuses, though to a lesser extent than in the case of OFDM-CDMA communication apparatuses.

DISCLOSURE OF INVENTION

It is an object of the present invention to provide an OFDM-CDMA radio transmitting apparatus and radio transmitting method that make it possible to achieve compatibility between spectral efficiency and error rate characteristics.

This object is achieved by selecting the number of multiplexing (that is, the number of code multiplexing) on a symbol-by-symbol basis when performing code division multiplexing of transmit symbols.

This object is also achieved by selecting the spreading ratio on a symbol-by-symbol basis when performing code division multiplexing of transmit symbols.

That is to say, if the number of code multiplexing of specific symbols is decreased or the spreading ratio is increased, the error rate characteristics of those symbols can be improved without much degradation of spectral efficiency. Also, by selecting as an above-described specific symbol a symbol to which data is allocated that requires better channel quality than other data, such as control information or retransmission information, it is possible to substantially improve overall system error rate characteristics.

BEST MODE FOR CARRYING OUT THE INVENTION

With reference now to the accompanying drawings, embodiments of the present invention will be explained in detail below.

Embodiment 1

Figure 1:
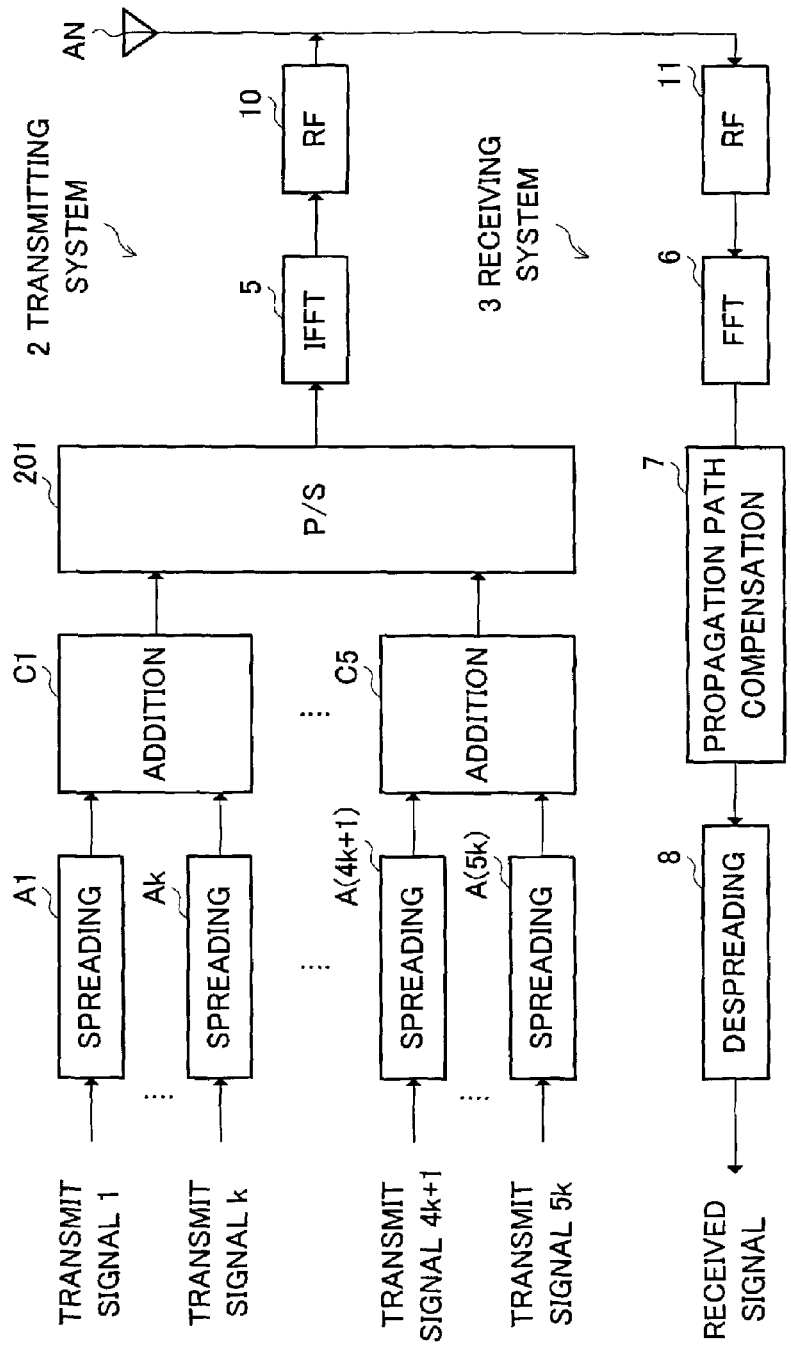
FIG. 1 is a block diagram showing the configuration of a conventional OFDM-CDMA communication apparatus.
Figure 2:
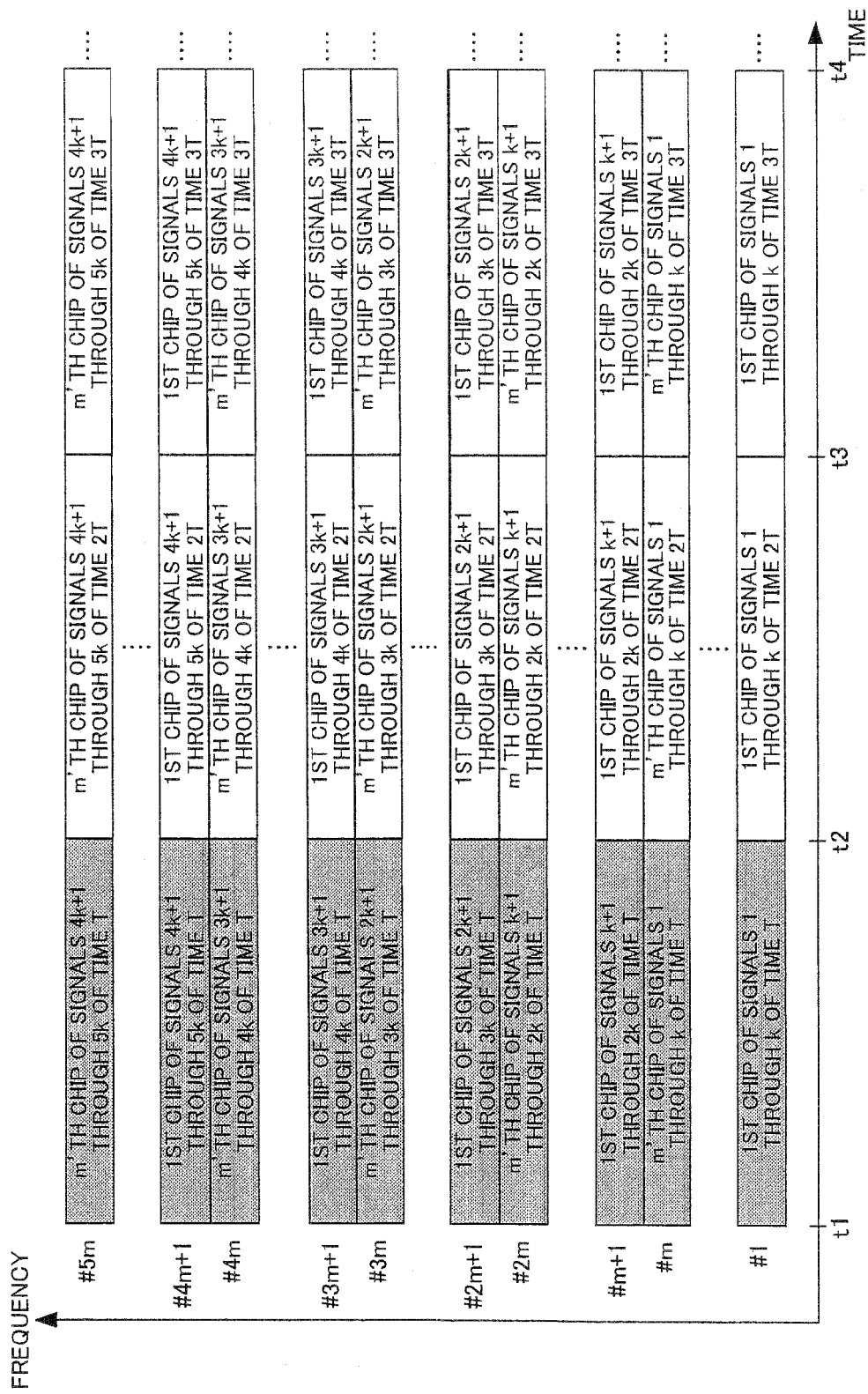
FIG. 2 is a drawing showing an example of conventional signal arrangement of an OFDM-CDMA signal.
Figure 3:
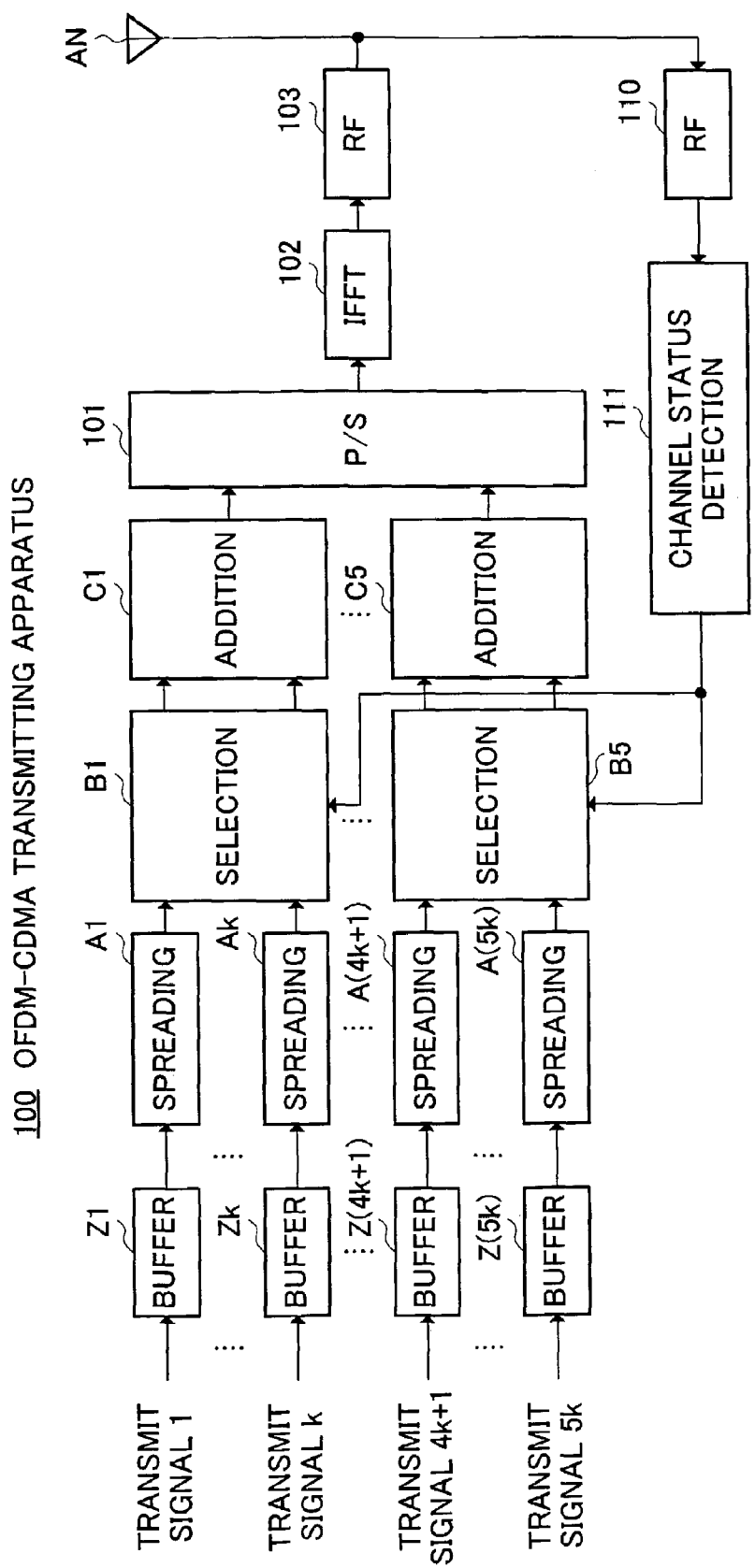
FIG. 3 is a block diagram showing a configuration of an OFDM-CDMA transmitting apparatus according to Embodiment 1 of the present invention.

FIG. 3 shows an outline configuration of an OFDM-CDMA transmitting apparatus according to Embodiment 1 of the present invention. OFDM-CDMA transmitting apparatus 100 carries out OFDM-CDMA transmission by performing code division multiplexing of a plurality of transmit signals 1 through 5k using different spreading codes for each, and distributing code division multiplexed spread signals among a plurality of mutually orthogonal subcarriers.

In OFDM-CDMA transmitting apparatus 100, a plurality of transmit signals 1 through k, ..., (4k+1) through 5k are input via buffers Z1 through Z(5k) to spreaders A1 through A(5k) that perform spreading on a chip-by-chip basis using different spreading codes. After spreading, signals are grouped into a plurality of systems and input to selection sections B1, ..., B5, with k spread signals for transmit signals (4k+1) through 5k input to selection section B5. Transmit signals 1 through k, ..., (4k+1) through 5k are signals comprising symbols on which QPSK (Quadrature Phase Shift Keying) modulation processing or 16-value QAM modulation processing has been executed by a modulation section (not shown).

Selection sections B1 through B5 have a function as number-of-multiplexing selection sections that select the number of multiplexing for each transmit symbol. In the case of this embodiment, selection sections B1 through B5 select the number of multiplexing based on information from a channel status detection section 111. Specifically, a channel status sent from each user is detected by channel status detection section 111 after passing via an antenna AN and receiving radio section (RF) 110, and the number of multiplexing is selected on a user-by-user basis according to the channel status of each user.

For example, in the case of selection section B1, which selects the number of multiplexing of transmit signals 1 through k, if the channel status of the user that transmits transmit signal 1 is poor, selection section B1 does not select all k transmit signals 1 through k, but selects and outputs n (n<k) transmit signals including transmit signal 1.

Adders C1 through C5 form code division multiplexed signals by multiplexing post-spreading signals selected by selection sections B1 through B5.

Code division multiplexed signals output from adders C1 through C5 undergo parallel-serial conversion by a parallel-serial conversion section (P/S) 101, and are then orthogonal frequency division multiplexed by undergoing inverse fast Fourier transform processing by an inverse fast Fourier transform section (IFFT) 102. By this means, an OFDM-CDMA signal is formed in which post-spreading chips are distributed among a plurality of subcarriers that have a mutually orthogonal relationship, and this OFDM-CDMA signal is transmitted via a radio transmitting section (RF) 103 that performs radio transmission processing such as digital-analog conversion processing and signal amplification, and antenna AN.

Figure 4:
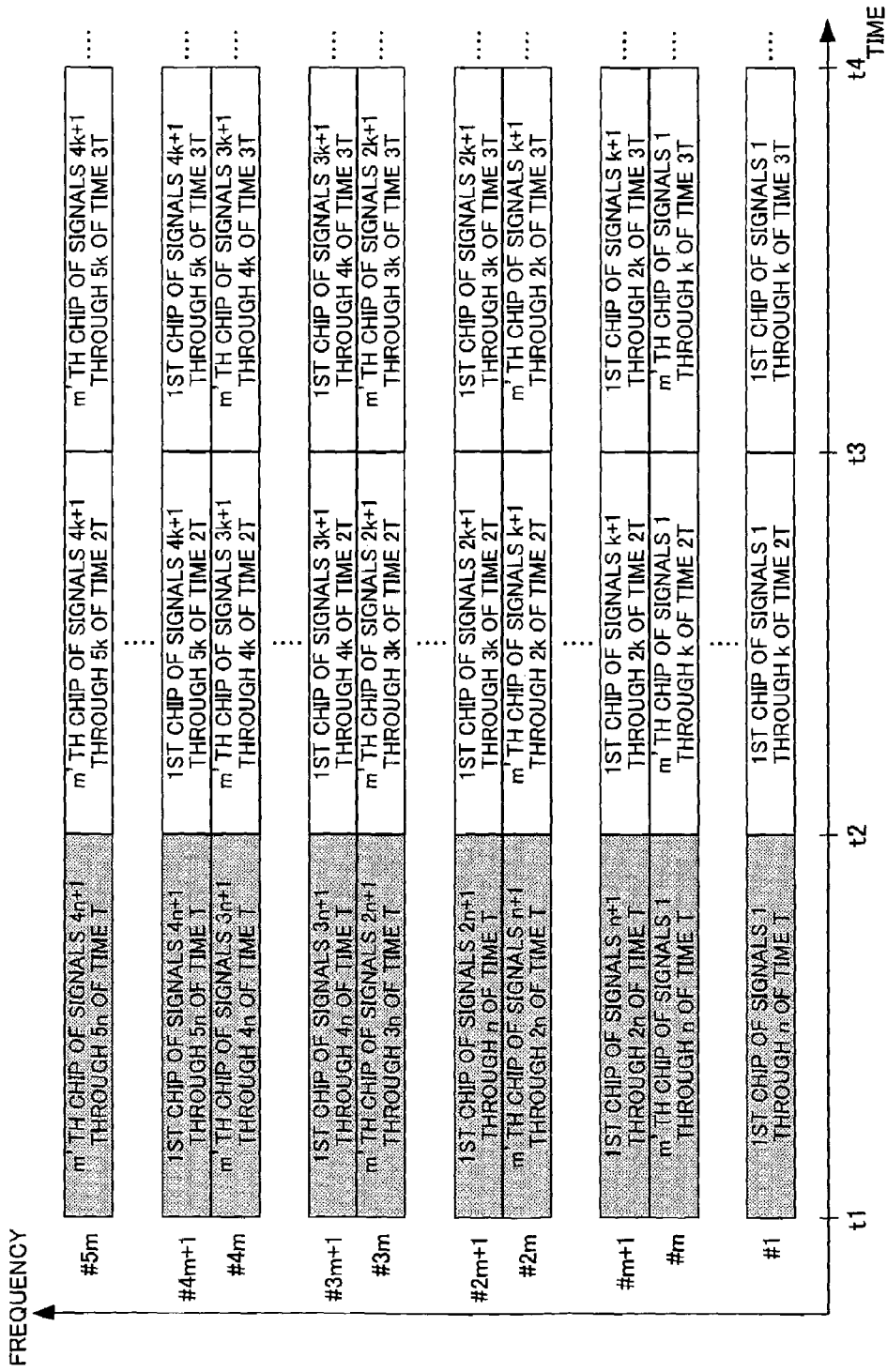
FIG. 4 is a drawing showing an example of signal arrangement of an OFDM-CDMA signal transmitted by an OFDM-CDMA transmitting apparatus of Embodiment 1.

FIG. 4 shows the frame format of an OFDM-CDMA signal transmitted by OFDM-CDMA transmitting apparatus 100. In OFDM-CDMA transmitting apparatus 100, the spreading ratio is made ⅕ the number of subcarriers, and all the subcarriers are divided into five subcarrier groups #1 through #m, #m+1 through #2m, #2m+1 through #3m, #3m+1 through #4m, and #4m+1 through #5m. The code division multiplexed signals obtained by means of adders C1 through C5 are allocated to these subcarrier groups.

For example, the code division multiplexed signal obtained by means of adder C1 is allocated to subcarrier group #1 through #m, distributed among frequency axis direction subcarriers, and the code division multiplexed signal obtained by means of adder C5 is allocated to subcarrier group #4m+1 through #5m, distributed among frequency axis direction subcarriers.

As can be seen from FIG. 4, OFDM-CDMA transmitting apparatus 100 performs transmission in which the transmit signal number of multiplexing is made smaller in a single burst period from time t1 to time t2 (number of multiplexing n<k), and performs transmission in which the transmit signal number of multiplexing is made larger in a single burst period from time t2 to time t3 and from time t3 to time t4 (number of multiplexing k).

That is to say, in the single burst period from time t1 to time t2, transmission is performed with the number of multiplexing reduced for a symbol of a user whose channel status is poor. Thus in this embodiment, transmission is performed with the number of multiplexing made smaller for a signal (symbol) of a user whose channel status is poor.

With the above configuration, OFDM-CDMA transmitting apparatus 100 detects channel statuses among users by means of channel status detection section 111, and transmits these to selection sections B1 through B5. In selection sections B1 through B5, the number of multiplexing is made smaller for a symbol directed to a user whose channel status is poor. A code division multiplexed signal for which the number of multiplexing has been selected as appropriate in this way is distributed among a plurality of mutually orthogonal subcarriers (that is to say, is arranged in a plurality of subcarriers so as to be spread along the frequency axis) by IFFT 102 as an orthogonal frequency division multiplexing section, and is made an OFDM-CDMA signal.

As a result, degradation of error rate characteristics can be suppressed for a signal whose number of multiplexing has been reduced since interference between spreading codes decreases even if orthogonality between spreading codes is lost due to multipath fading or the like. Also, since the number of multiplexing is not reduced for all transmit signals, but only for specific transmit signals (symbols) whose channel status is poor, there is little degradation of spectral efficiency due to a reduction in the number of multiplexing.

Thus, according to the above configuration, by reducing the number of multiplexing of symbols transmitted to a user whose channel status is poor, it is possible to implement an OFDM-CDMA transmitting apparatus 100 that enables spectral efficiency and error rate characteristics to be made compatible.

In this embodiment, a case has been described in which the number of multiplexing of symbols transmitted to a user whose channel status is poor is reduced, but the present invention is not limited to this, and the present invention can also be widely applied to cases where the number of multiplexing of specific transmit symbols is made smaller than the number of multiplexing of other transmit symbols.

Figure 5:
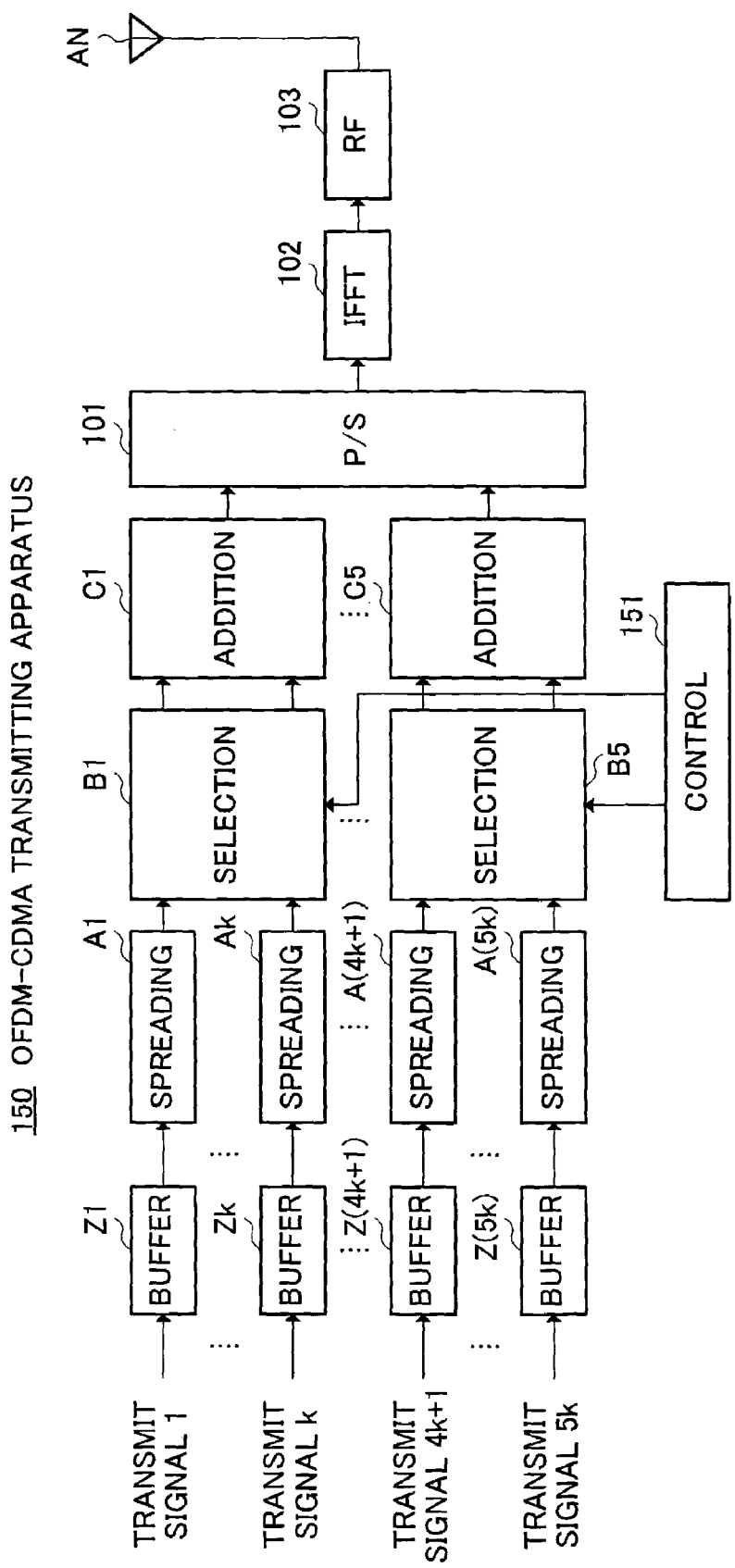
FIG. 5 is a block diagram showing another sample configuration of an OFDM-CDMA transmitting apparatus of Embodiment 1.

For example, if the number of multiplexing of symbols indicating control information or retransmission information is reduced, it is possible to improve the error rate characteristics of information that has a major effect on overall error rate characteristics and transmission efficiency. That is to say, it is advantageous to select a symbol for which better quality is required than for other symbols as a symbol whose number of signal multiplexing is to be reduced. This can be done, for example, by reducing the number of multiplexing of specific symbols in selection sections B1 through B5 based on a control signal indicating a specific symbol from a control signal 151, as in OFDM-CDMA transmitting apparatus 150 shown in FIG. 5.

Also, in this embodiment, a case has been described in which the spreading ratio is made ⅕ the number of subcarriers, but it goes without saying that the spreading ratio is not limited to this, and may be set arbitrarily. Furthermore, it is not necessary for the spreading ratios of each subcarrier group to be identical, and the spreading ratios can be set arbitrarily. Moreover, the present invention is not limited to a case in which subcarriers are divided into groups, as in this embodiment, and spread signals may be allocated to all subcarriers.

In FIG. 4, a case is illustrated in which the number of signal multiplexing of all subcarrier groups (n<k) is reduced in a certain burst interval (from time t1 to time t2), but the present invention is not limited to this. It is essential only that the number of multiplexing only of specific symbols be reduced, and the present invention is not limited to the frame format shown in FIG. 4.

Also, a case has been described in which the method of reducing the number of multiplexing of specific symbols is applied to a radio transmitting apparatus that performs OFDM-CDMA transmission, but an effect can also be obtained if the method of reducing the number of multiplexing of specific symbols is applied to a radio transmitting apparatus that performs DS-CDMA (Direct Spread CDMA) transmission. However, DS-CDMA uses only one carrier, and a spread signal is arranged only in the time axis direction. When the reception level falls due to the influence of multipath fading, the reception level of all spreading code chips falls, and therefore the effect of improving error rate characteristics is small compared with OFDM-CDMA.

That is to say, with OFDM-CDMA, the reception level of all spreading code chips does not fall since signals are arranged spread in the frequency direction, and therefore a frequency diversity effect can be obtained. Therefore, the error rate improvement effect is large even in a multipath environment. OFDM-CDMA differs from DS-CDMA in this respect.

Thus, although the method of this embodiment whereby the number of multiplexing of specific symbols is made smaller than the number of multiplexing of other symbols also has an effect when applied to DS-CDMA, a much more marked effect is apparent when this method is applied to OFDM-CDMA.

Embodiment 2

In this embodiment, it is proposed that the spreading ratio of specific symbols be made larger than the spreading ratio of other symbols. By this means, it is possible to make the quality of specific symbols better than that of other symbols when despread on the receiving side. Also, although spectral efficiency falls when the spreading ratio is increased, since only the spreading ratio of specific symbols is increased, spectral efficiency is not decreased so much.

As with a symbol whose number of multiplexing is reduced in Embodiment 1, it is advantageous to select a symbol for which better quality is required than for other symbols, such as a symbol transmitted to a user whose channel status is poor or a symbol indicating control information or retransmission information, as a symbol whose spreading ratio is to be increased.

Figure 6:
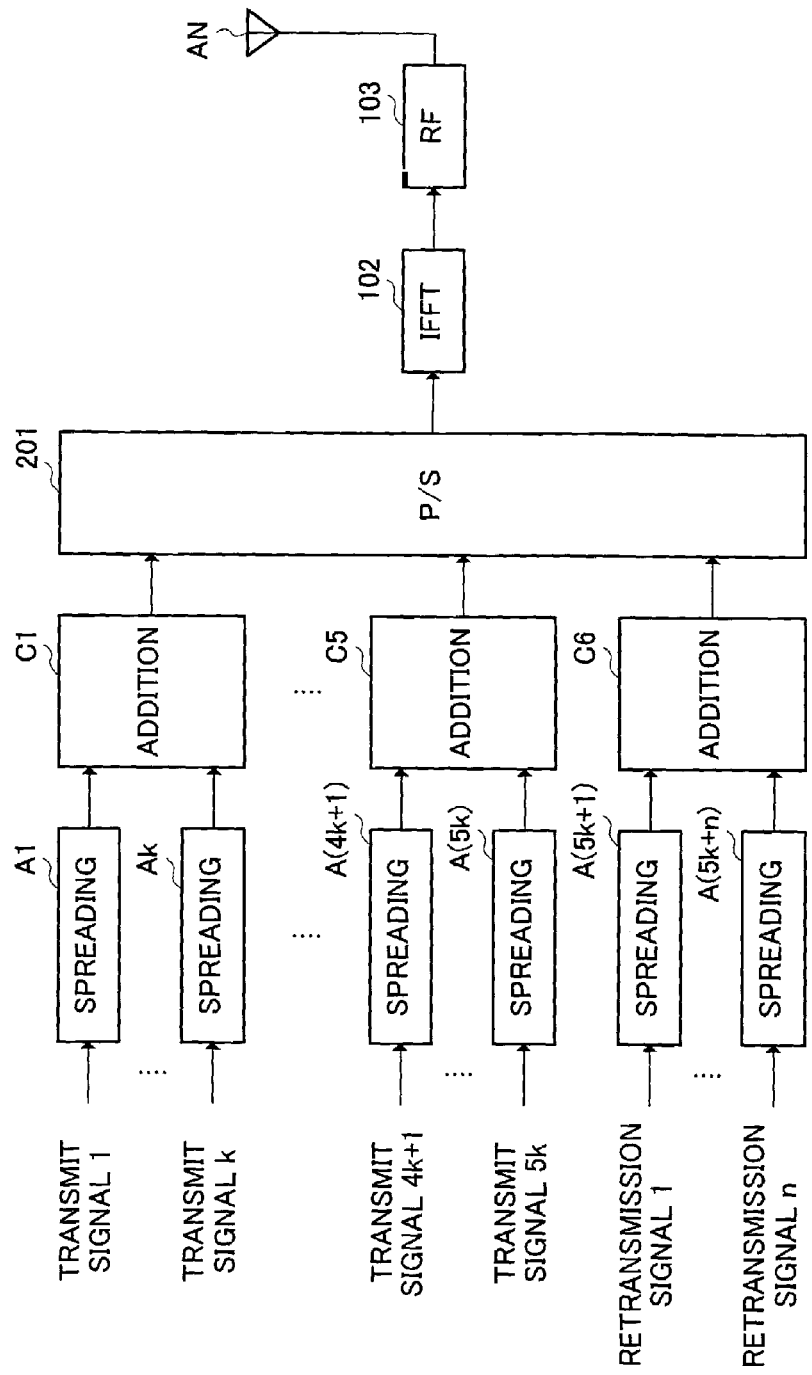
FIG. 6 is a block diagram showing the configuration of an OFDM-CDMA transmitting apparatus of Embodiment 2.

FIG. 6 shows the outline configuration of an OFDM-CDMA transmitting apparatus of this embodiment. In FIG. 6, in which parts corresponding to those in FIG. 3 are assigned the same codes as in FIG. 3, OFDM-CDMA transmitting apparatus 200 makes the spreading ratio of retransmission signals 1 through n larger than the spreading ratio of other transmit signals. That is to say, spreading sections A(5$k$+1) through A(5$k$+n) for spreading retransmission signals 1 through n spread retransmission signals 1 through n using spreading codes with a larger spreading ratio than the other spreading sections A1 through A(5$k$). After spreading, signals are multiplexed by adder C6 and then input to a parallel-serial conversion section (P/S) 201.

In actuality, one more code division multiplexed signal is input to parallel-serial conversion section 201 of OFDM-CDMA transmitting apparatus 200 than to parallel-serial conversion section 101 of OFDM-CDMA transmitting apparatus 100, since OFDM-CDMA transmitting apparatus 200 has one more adder (C6) than adders C1 through C5 of OFDM-CDMA transmitting apparatus 100, and as the spreading ratio of this code division multiplexed signal is larger than for other code division multiplexed signals, the chip rate is higher.

When spread signals with an increased spreading ratio are arranged only in the frequency axis direction, the spread symbol frequency band increases. Methods for preventing this are to change the subcarrier group to which spread signals are allocated, or to allocate spread signals to both frequency direction subcarriers and time direction subcarriers (known as two-dimensional spreading).

With the method whereby the subcarrier group is changed, if the spreading ratio of retransmission signals 1 through n is set to twice that of the other transmit signals 1 through 5k, for example, two groups of subcarriers rather than one group of subcarriers can be made to correspond to the same number of transmit signals. Correspondence between code division multiplexed signals and subcarrier groups can be achieved by setting appropriately the order in which code division multiplexed signals obtained by means of adders C1 through C6 are output by parallel-serial conversion section (P/S) 201 to inverse Fourier transform section (IFFT) 102.

Figure 8:
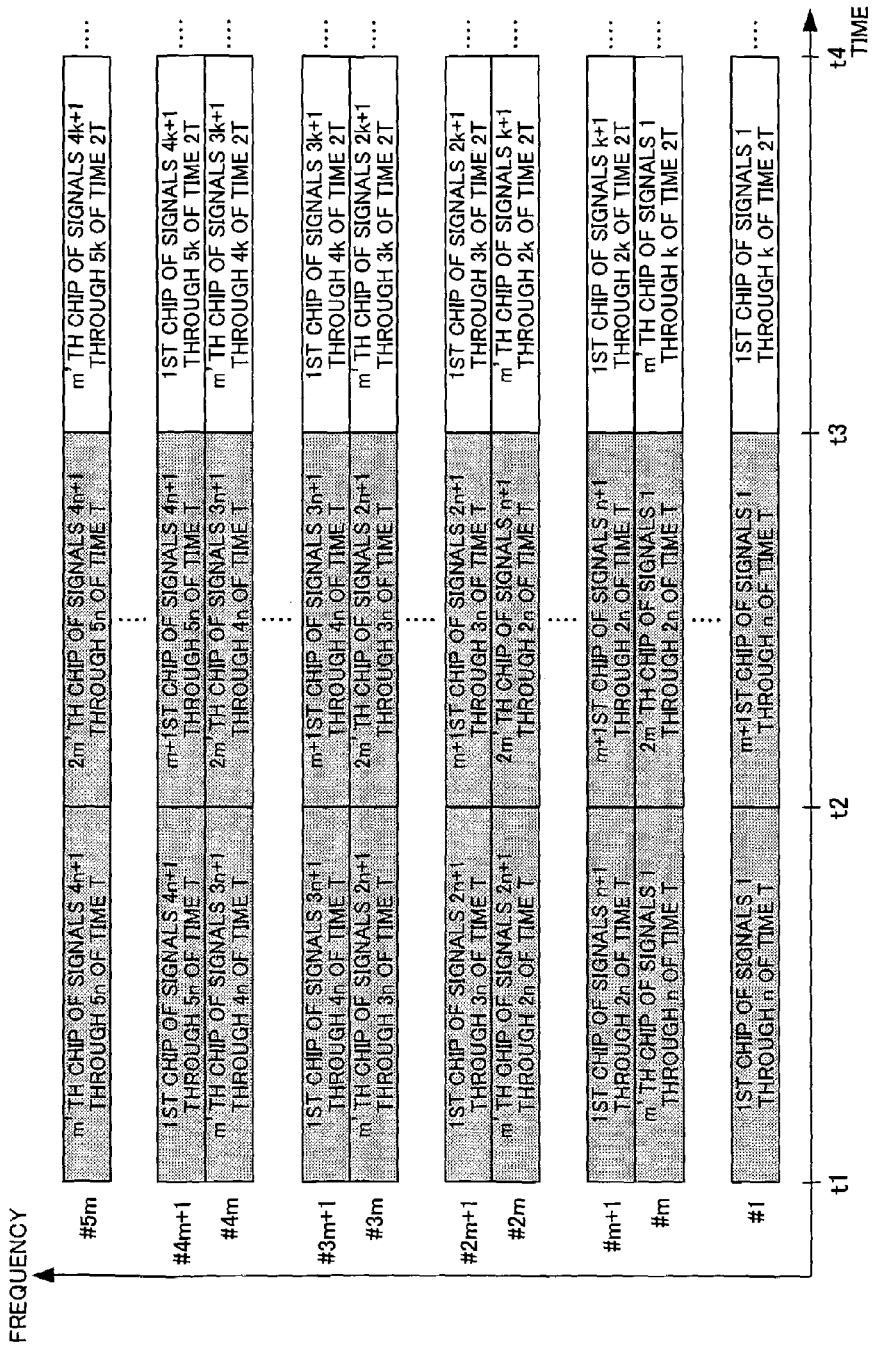
FIG. 8 is a drawing showing an example of signal arrangement of an OFDM-CDMA signal provided for explanation of two-dimensional spreading.

Next, two-dimensional spreading will be described using FIG. 8. To simplify the explanation, it is assumed in FIG. 8 that transmit signals 1 through 5k are all retransmitted in two burst intervals of time t1 to time t2 and time t2 to time t3. That is to say, it is assumed that retransmission signals 1 through 5n are retransmitted using twice the spreading ratio of initial transmission. At this time, chip 1 through chip m of retransmission signals 1 through 5n are transmitted in the burst interval from time t1 to time t2, and chip m+1 through chip 2m are transmitted in the burst interval from time t2 to time t3. By transmitting spread signals spread two-dimensionally in the frequency direction and time direction in this way, the desired number of symbols can be transmitted without extending the frequency band even though the spreading ratio is increased.

Figure 7:
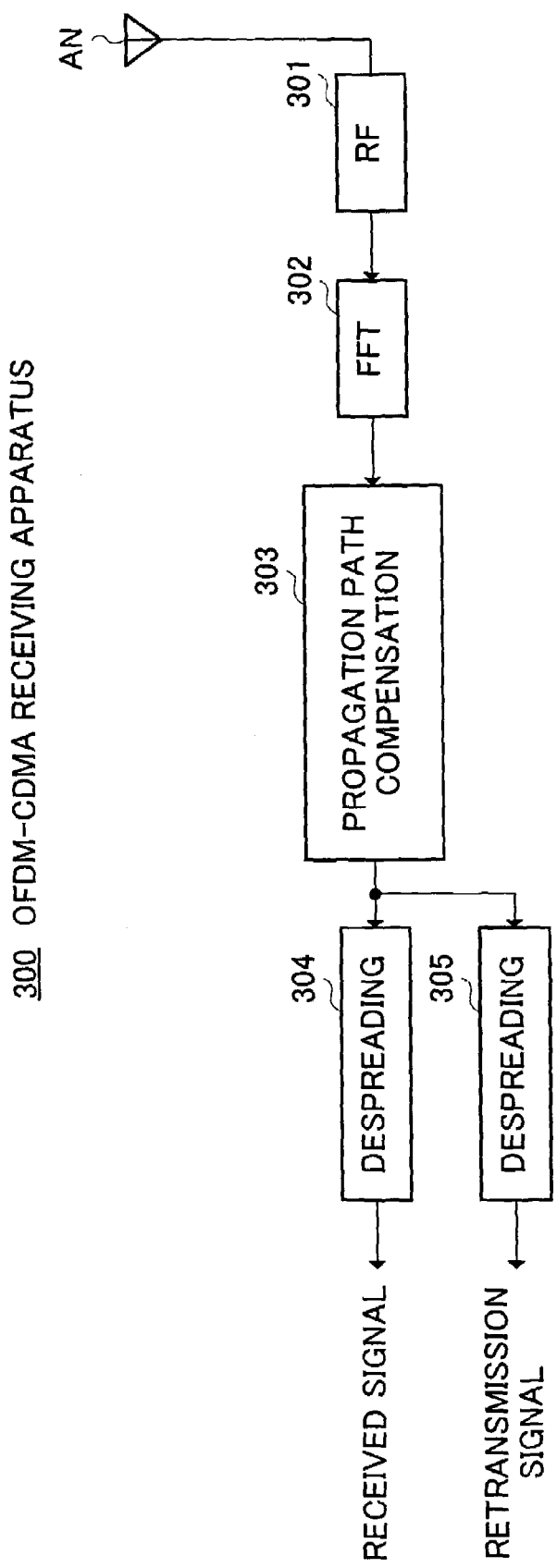
FIG. 7 is a block diagram showing the configuration of an OFDM-CDMA receiving apparatus of Embodiment 2.

FIG. 7 shows the configuration of an OFDM-CDMA receiving apparatus 300 that receives and demodulates an OFDM-CDMA signal transmitted from OFDM-CDMA transmitting apparatus 200. In OFDM-CDMA receiving apparatus 300, an OFDM-CDMA signal transmitted from OFDM-CDMA transmitting apparatus 200 is input to a fast Fourier transform section (FFT) 302 via an antenna AN and a radio receiving section (RF) 301 that performs radio reception processing such as analog-digital conversion processing. FFT 302 executes FFT processing on the input signal and obtains code division multiplexed signals transmitted by the respective subcarriers.

A propagation path compensation section 303 compensates for phase fluctuations, etc., occurring in the propagation path, based on a known signal such as a propagation path estimation preamble included in the signal. After propagation path compensation, the signal is input to despreading sections 304 and 305 with different numbers of taps. In the case of this embodiment, since the retransmission signal spreading ratio is twice that of a normal transmit signal, the number of taps of despreading section 305 for despreading a retransmission signal is twice that of despreading section 304, which despreads a normal transmit signal. By this means, both a normal transmit signal and a retransmission signal can be reconstructed.

According to the above configuration, by making the spreading ratio of symbols transmitted to a user whose channel status is poor and symbols for which better quality is required than for other symbols, such as symbols indicating control information or retransmission information, larger than the spreading ratio of other symbols, it is possible to implement an OFDM-CDMA transmitting apparatus 200 that enables spectral efficiency and error rate characteristics to be made compatible.

In this embodiment, a case has been described in which the method of increasing the spreading ratio of specific symbols is applied to a radio transmitting apparatus that performs OFDM-CDMA transmission, but an effect can also be obtained if the method of increasing the spreading ratio of specific symbols is applied to a radio transmitting apparatus that performs DS-CDMA (Direct Sequence CDMA) transmission. However, in addition to the difference between OFDM-CDMA and DS-CDMA described at the end of Embodiment 1, there is also a difference when the spreading ratio is increased.

That is to say, with DS-CDMA, since the cycle of one symbol is lengthened when the spreading ratio of specific symbols is set larger, error rate characteristic degradation with respect to time fluctuations such as frequency offset and fading is comparatively great. With OFDM-CDMA, on the other hand, since spread signals are arranged in the frequency direction, error rate characteristic degradation with respect to time fluctuations such as frequency offset and fading is not great. Thus, although the method of this embodiment whereby the spreading ratio of specific symbols is made larger than the spreading ratio of other symbols also has an effect when applied to DS-CDMA, a much more marked effect is apparent when this method is applied to OFDM-CDMA.

Also, if the method of this embodiment whereby the spreading ratio of specific symbols is made larger than the spreading ratio of other symbols is combined with the method of Embodiment 1 whereby the number of multiplexing of specific symbols is made smaller than the number of multiplexing of other symbols, compatibility between spectral efficiency and error rate characteristics can be achieved to a greater number.

Embodiment 3

In this embodiment it is proposed that, when a known signal is transmitted for cell identification, the number of signal multiplexing of that known signal be reduced or the spreading ratio of that known signal be increased. By this means, a known signal for cell identification can be transmitted with good quality, enabling the probability of erroneous cell identification by the communicating party to be reduced.

By including a known signal for cell identification in a transmit signal, a radio base station that performs OFDM-CDMA or DS-CDMA transmission enables a communication terminal that is the transmission target station to identity the cell to which it belongs. That is to say, cell identification is made possible by having a radio base station transmit a known signal corresponding to a cell, and having a communication terminal identify the type of transmitted known signal. This embodiment improves cell identification characteristics without reducing spectral efficiency.

Figure 9:
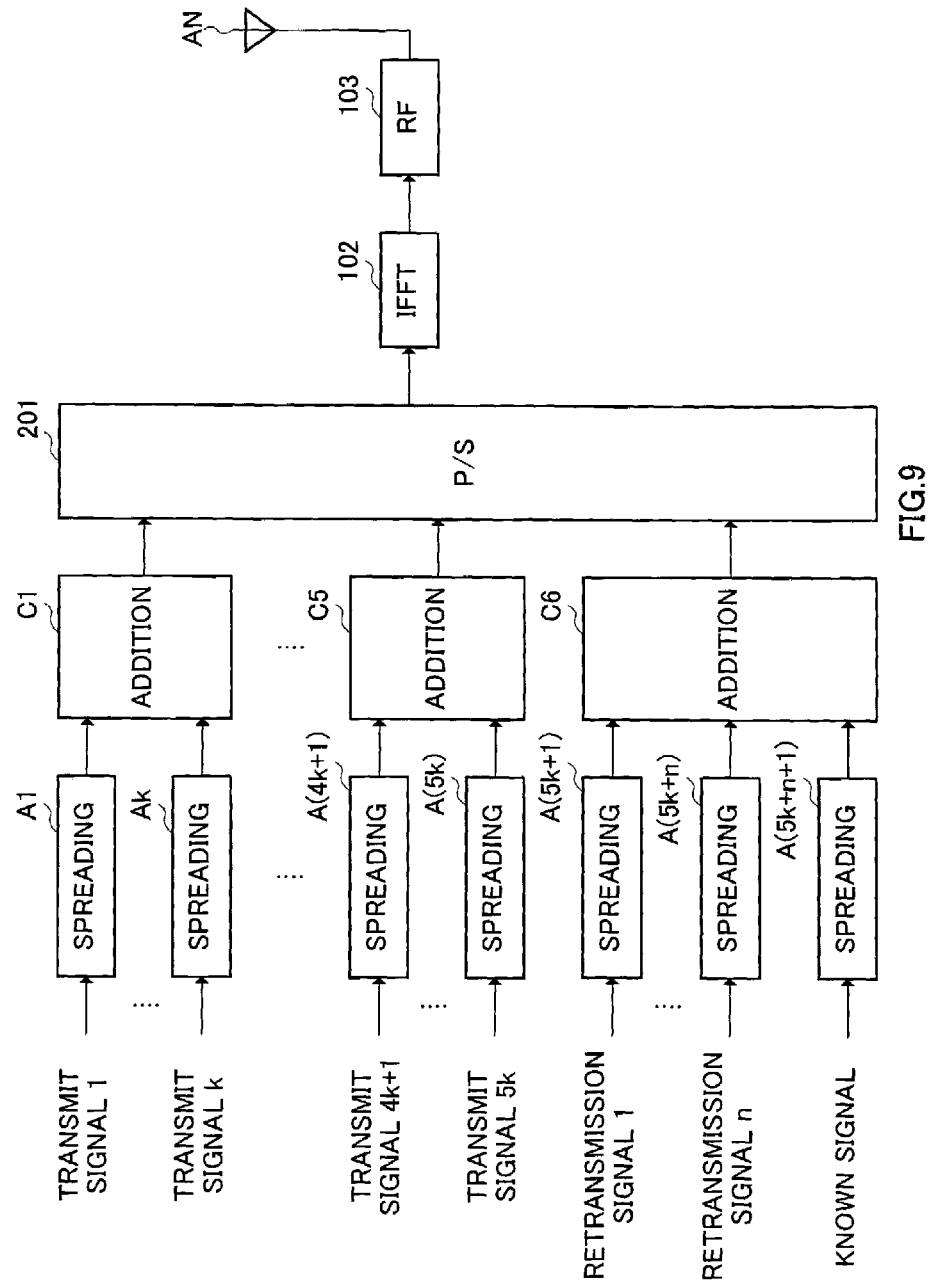
FIG. 9 is a block diagram showing the configuration of an OFDM-CDMA transmitting apparatus of Embodiment 3.

FIG. 9 shows the configuration of an OFDM-CDMA transmitting apparatus 400 of this embodiment. In OFDM-CDMA transmitting apparatus 400 in FIG. 9, in which parts corresponding to those in FIG. 6 are assigned the same codes as in FIG. 6, a known signal for cell identification is input to spreading section A(5k+n+1) The spreading ratio of spreading section A(5k+n+1) is set larger than the spreading ratio for other transmit signals 1 through 5k, in the same way as for spreading sections A(5k+1) through A(5k+n) that spread retransmission signals 1 through n. By this means, receiving-side error rate characteristics for a known signal for cell identification can be improved.

Also, in OFDM-CDMA transmitting apparatus 400, the number of multiplexing of adder C6 is made smaller than the number of multiplexing of the other adders C1 through C5. That is to say, the total number of signals (n+1) resulting from adding the known signal to retransmission signals 1 through n input to adder C6 is smaller than the number (k) of transmit signals 1 through k, ..., 4k+1 through 5k input to the other adders C1 through C5. By this means, the known signal and retransmission signal error rate characteristics can be substantially improved.

Thus, according to the above configuration, by reducing the number of signal multiplexing of a known signal for cell identification in comparison with the number of multiplexing of other transmit signals, and/or increasing the spreading ratio, it is possible to implement an OFDM-CDMA transmitting apparatus 400 that enables cell identification to be performed correctly by a communication terminal without significantly reducing spectral efficiency.

In this embodiment, a case has been described in which the number of signal multiplexing of a known signal for cell identification is reduced in comparison with the number of multiplexing of other transmit signals, and the spreading ratio is also increased, but the present invention is not limited to this, and it is also possible for only the number of signal multiplexing to be reduced, or for only the spreading ratio to be increased.

Embodiment 4

In this embodiment it is proposed that, when a known signal for frame synchronization is transmitted placed at the start of a frame, the number of signal multiplexing of that known signal be reduced and/or the spreading ratio of that known signal be increased. By this means, a known signal for frame synchronization can be transmitted with good quality, enabling the communicating party to perform frame synchronization processing with a high number of precision.

There are cases where a radio base station that performs OFDM-CDMA or DS-CDMA transmission transmits a known signal for frame synchronization placed at the start of a transmit frame. A communication terminal then performs frame synchronization by detecting this known signal. This embodiment improves the precision of frame synchronization without reducing spectral efficiency.

Figure 10:
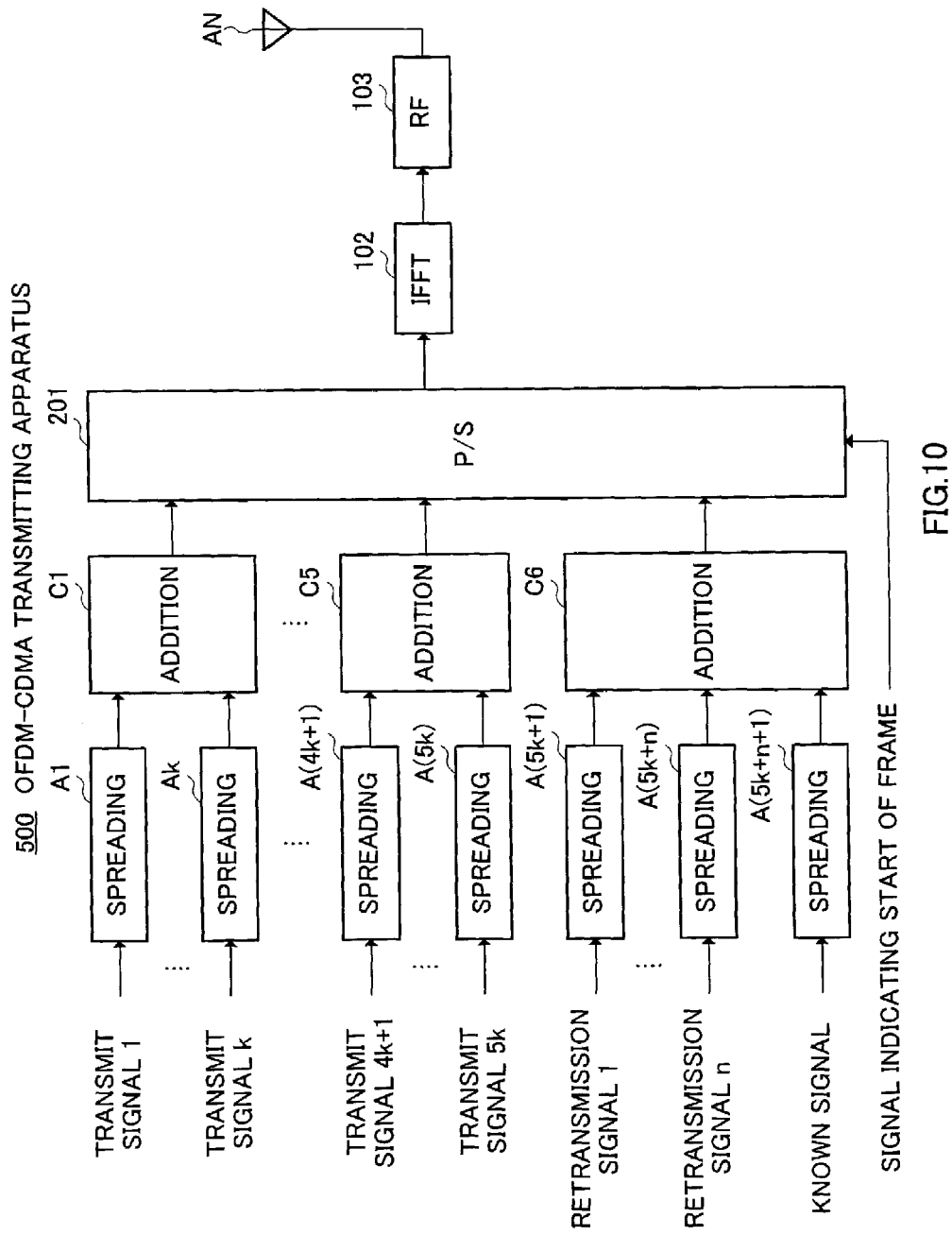
FIG. 10 is a block diagram showing the configuration of an OFDM-CDMA transmitting apparatus of Embodiment 4.

FIG. 10 shows the outline configuration of an OFDM-CDMA transmitting apparatus of this embodiment. In OFDM-CDMA transmitting apparatus 500 in FIG. 10, in which parts corresponding to those in FIG. 6 are assigned the same codes as in FIG. 6, a known signal for frame synchronization is input to spreading section A(5k+n+1) The spreading ratio of spreading section A(5k+n+1) is set larger than the spreading ratio for other transmit signals 1 through 5k, in the same way as for spreading sections A(5k+1) through A(5k+n) that spread retransmission signals 1 through n. By this means, receiving-side error rate characteristics for a known signal for frame synchronization can be improved.

Also, in OFDM-CDMA transmitting apparatus 500, the number of multiplexing of adder C6 is made smaller than the number of multiplexing of the other adders C1 through C5. That is to say, the total number of signals (n+1) resulting from adding the known signal to retransmission signals 1 through n input to adder C6 is smaller than the number (k) of transmit signals 1 through k, ..., 4k+1 through 5k input to the other adders C1 through C5. By this means, the error rate characteristics of the known signal for frame synchronization and retransmission signals can be substantially improved.

A signal indicating the start of a frame from a control section (not shown) is input to parallel-serial conversion section (P/S) 201, in addition to the code division multiplexed signals obtained by means of adders C1 through C6. Parallel-serial conversion section 201 outputs a code division multiplexed signal input from adder C6, at the timing at which the signal indicating the start of a frame is input. By this means, the code division multiplexed known signal can be placed at the start of an OFDM-CDMA signal frame.

According to the above configuration, by reducing the number of signal multiplexing of a known signal for frame synchronization in comparison with the number of multiplexing of other transmit signals, and also increasing the spreading ratio, it is possible to implement an OFDM-CDMA transmitting apparatus 500 that enables the precision of frame synchronization by a communication terminal to be improved without significantly reducing spectral efficiency.

In this embodiment, a case has been described in which the number of signal multiplexing of a known signal for frame synchronization is reduced in comparison with the number of multiplexing of other transmit signals, and the spreading ratio is also increased, but the present invention is not limited to this, and it is also possible for only the number of signal multiplexing to be reduced, or for only the spreading ratio to be increased.

Embodiment 5

In this embodiment it is proposed that the number of multiplexing of a retransmission signal be reduced and/or the spreading ratio be increased in accordance as the number of retransmissions increases. By this means, it is possible to prevent the number of retransmissions from becoming large in a state in which degradation of spectral efficiency is suppressed.

If an error is present even though retransmission has been performed, it is necessary to perform retransmission again, and if the improvement in quality due to retransmission is poor, the number of retransmissions may become extremely large. The number of retransmissions becoming extremely large means that the delay between transmitting and receiving data is increased. That is to say, the amount of data transmitted per unit time decreases, and transmission efficiency degrades.

Taking this into consideration, in this embodiment the effect of improving error rate characteristics as the number of retransmissions increases is heightened by reducing the number of code multiplexing or increasing the spreading ratio in accordance as the number of retransmissions increases. By this means it is possible to prevent the number of retransmissions from becoming large.

Compared with the case in which the number of code multiplexing is reduced or the spreading ratio is increased from the time when the number of retransmissions is small, it is possible to reduce the number of retransmissions effectively without reducing the amount of transmitted data unnecessarily. This is because, depending on the channel quality, errors may not occur even if the number of code multiplexing is suddenly reduced or the spreading ratio is suddenly increased when retransmitting. In such a case, the amount of transmitted data will fall if the number of code multiplexing of a retransmission signal is reduced unnecessarily or the spreading ratio is increased unnecessarily when there is a retransmission request, and therefore by reducing the number of code multiplexing or increasing the spreading ratio in accordance as the number of retransmissions increases, it is possible to suppress a drop in the amount of transmitted data and reduce the number of retransmissions effectively.

Figure 11:
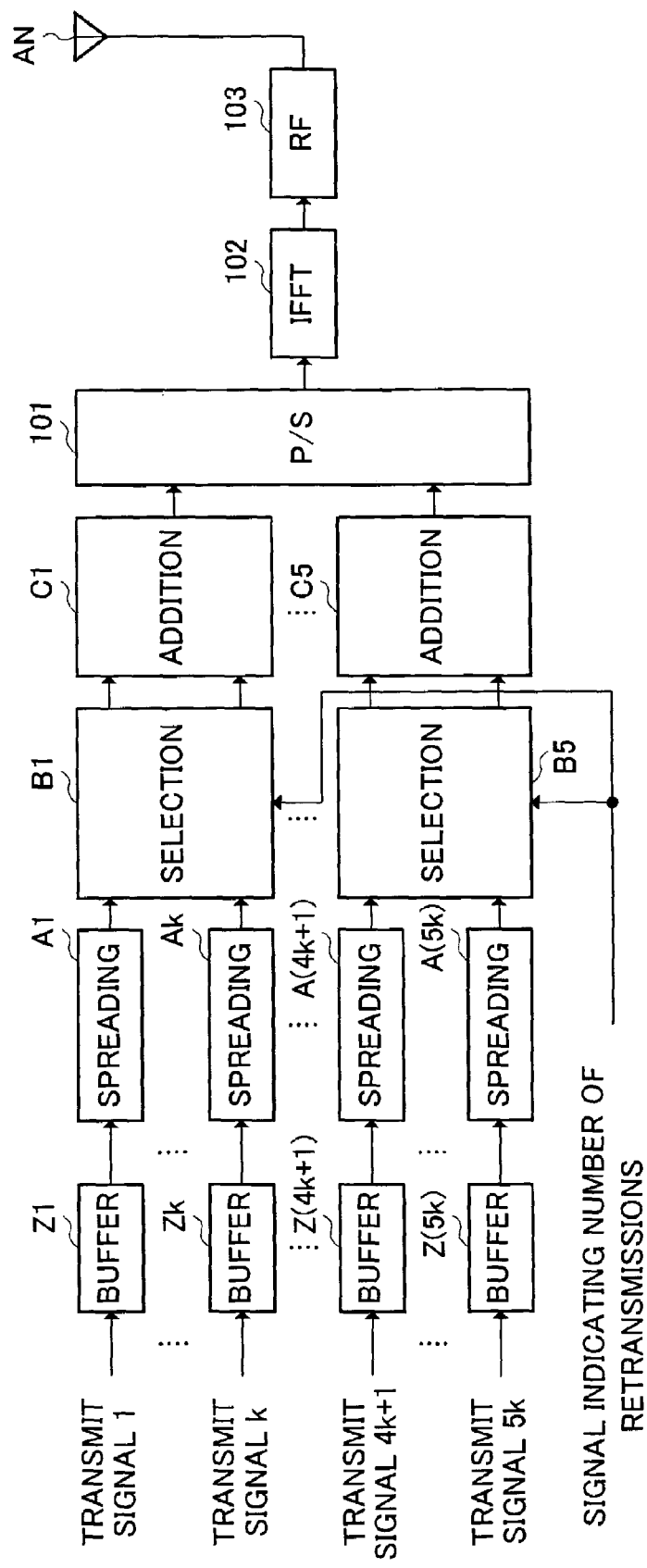
FIG. 11 is a block diagram showing the configuration of an OFDM-CDMA transmitting apparatus of Embodiment 5.

FIG. 11 shows the outline configuration of an OFDM-CDMA transmitting apparatus of this embodiment. In OFDM-CDMA transmitting apparatus 600 in FIG. 11, in which parts corresponding to those in FIG. 3 are assigned the same codes as in FIG. 3, information indicating the number of retransmissions is input to selection sections B1 through B5 that select the number of multiplexing of transmit signals.

This information indicating the number of retransmissions is output from a control section (not shown).

When input post-spreading transmit signals include a signal for which the number of retransmissions is large, based on the information indicating the number of retransmissions, selection sections B1 through B5 reduce the number of signal multiplexing for that signal in accordance with the number of retransmissions of that signal.

This will now be described in specific terms. When, for example, transmit signals 1 through k are all initial-transmission signals, selection section B1 selects and outputs all of input transmit signals 1 through k. By this means, a code division multiplexed signal for which the number of signal multiplexing is k is obtained by adder C1. On the other hand, if, for example, transmit signal 1 is a first-time retransmission signal (i.e. a signal for which the number of retransmissions is 1), selection section B1 selects and outputs (k−1) transmit signals including transmit signal 1 from among input transmit signals 1 through k. By this means, a code division multiplexed signal for which the number of signal multiplexing is (k−1) including the first-time retransmission signal, transmit signal 1, is obtained by adder C1.

Also, if, for example, transmit signal 1 is a second-time retransmission signal (i.e. a signal for which the number of retransmissions is 2), selection section B1 selects and outputs (k−2) transmit signals including transmit signal 1 from among input transmit signals 1 through k. By this means, a code division multiplexed signal for which the number of signal multiplexing is (k−2) including the second-time retransmission signal, transmit signal 1, is obtained by adder C1.

As code division multiplexed signal inter-code interference is less the smaller the number of signal multiplexing, transmission can be performed with better quality in proportion to the number of retransmissions of a retransmission signal.

According to the above configuration, by reducing the number of signal multiplexing for a retransmission signal in accordance as the number of retransmissions increases, it is possible to reduce the number of retransmissions in a state in which degradation of spectral efficiency is minimized. As a result, it is possible to implement an OFDM-CDMA transmitting apparatus 600 that enables spectral efficiency and error rate characteristics to be made compatible.

In FIG. 11, a configuration is illustrated whereby the number of signal multiplexing for a retransmission signal is reduced in accordance as the number of retransmissions increases, but a similar effect can also be obtained if the spreading ratio is increased proportionally the greater the number of retransmissions of a retransmission signal according to information indicating the number of retransmissions.

Embodiment 6

In Embodiment 5, a case has been described in which a method whereby the number of multiplexing of a retransmission signal is reduced and/or the spreading ratio is increased in accordance as the number of retransmissions increases is applied to an OFDM-CDMA radio transmitting apparatus, but in this embodiment it is proposed that this method be applied to a DS-CDMA radio transmitting apparatus.

With the OFDM-CDMA method, as explained above, since signals are spread in the frequency direction, the reception level of all spreading code chips does not fall, and therefore a frequency diversity effect is obtained. Therefore, the error rate improvement effect is great in a multipath environment. However, since OFDM-CDMA is a multicarrier transmission method, disadvantages are that peak power is high and overall apparatus power consumption is large.

With DS-CDMA, on the other hand, peak power can be kept low compared with OFDM-CDMA, enabling overall apparatus power consumption to be kept low. Therefore, DS-CDMA is more advantageous from the standpoint of keeping overall apparatus power consumption low. Taking this point into consideration, in this embodiment it is proposed that the present invention be applied to a DS-CDMA radio transmitting apparatus.

Figure 12:
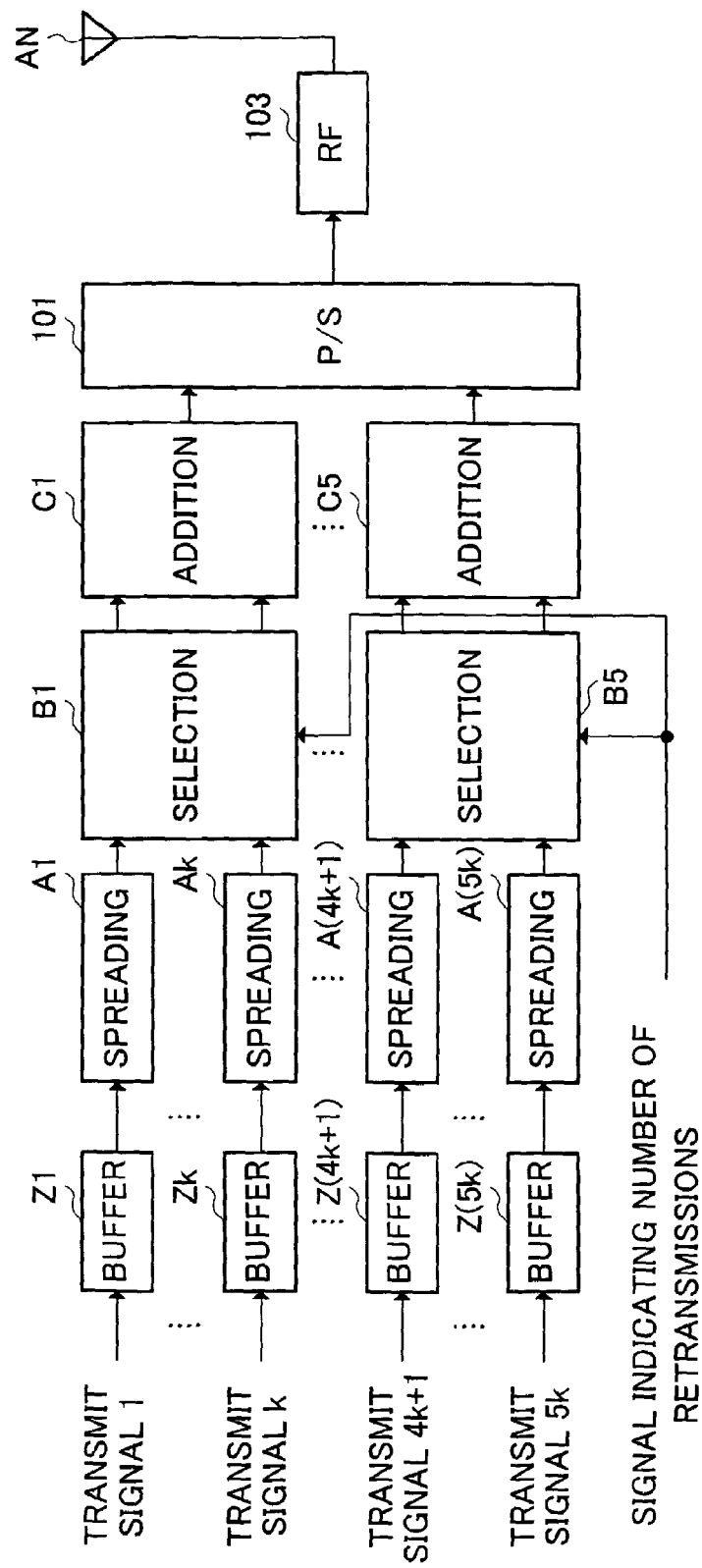
FIG. 12 is a block diagram showing the configuration of a CDMA transmitting apparatus of Embodiment 6.

FIG. 12 shows the outline configuration of a CDMA transmitting apparatus of this embodiment. In FIG. 12, in which parts corresponding to those in FIG. 11 are assigned the same codes as in FIG. 11, CDMA transmitting apparatus 700 has a similar configuration to OFDM-CDMA transmitting apparatus 600 in FIG. 11, except that it performs DS-CDMA transmission. That is to say, except for the fact that processing whereby the number of multiplexing of a retransmission signal is reduced and/or the spreading ratio is increased in accordance as the number of retransmissions increases is applied to DS-CDMA transmission, CDMA transmitting apparatus 700 is the same as OFDM-CDMA transmitting apparatus 600 of Embodiment 5.

In this way, it is possible to implement a CDMA transmitting apparatus 700 that enables spectral efficiency and error rate characteristics to be made compatible.

Also, if processing whereby the number of multiplexing of a retransmission signal is reduced and/or the spreading ratio is increased in accordance as the number of retransmissions increases is used in an HSDPA (High Speed Downlink Packet Access) radio transmitting apparatus that transmits data using a high-speed outbound channel, the number of retransmissions can be reduced effectively without degrading spectral efficiency too much.

Embodiment 7

In Embodiments 7 through 10 below, CDMA and OFDM-CDMA radio transmitting apparatuses and methods thereof are proposed that enable the number of retransmissions to be reduced effectively with almost no error rate degradation.

A common concept of Embodiments 7 through 10 below is that the number of spreading codes assigned to a retransmission signal is increased as the number of retransmissions increases. That is to say, a retransmission signal is transmitted by code division multiplexing using a plurality of spreading codes in accordance with the number of retransmissions.

By this means, retransmission signal error rate characteristics can be improved on the receiving side by despreading a code division multiplexed retransmission signal to which a plurality of spreading codes are assigned, using the same plurality of spreading codes as on the transmitting side, and selecting or combining the despreading results with the greatest correlation power thereamong. As a result, the number of retransmissions can be prevented from increasing excessively with almost no degradation of transmission efficiency.

By adding the configurations described in Embodiments 7 through 10 below as appropriate to above-described Embodiments 1 through 6, it is possible, in addition to obtaining the effects obtained in Embodiments 1 through 6, to reduce substantially the number of retransmissions with almost no error rate degradation.

Figure 13:
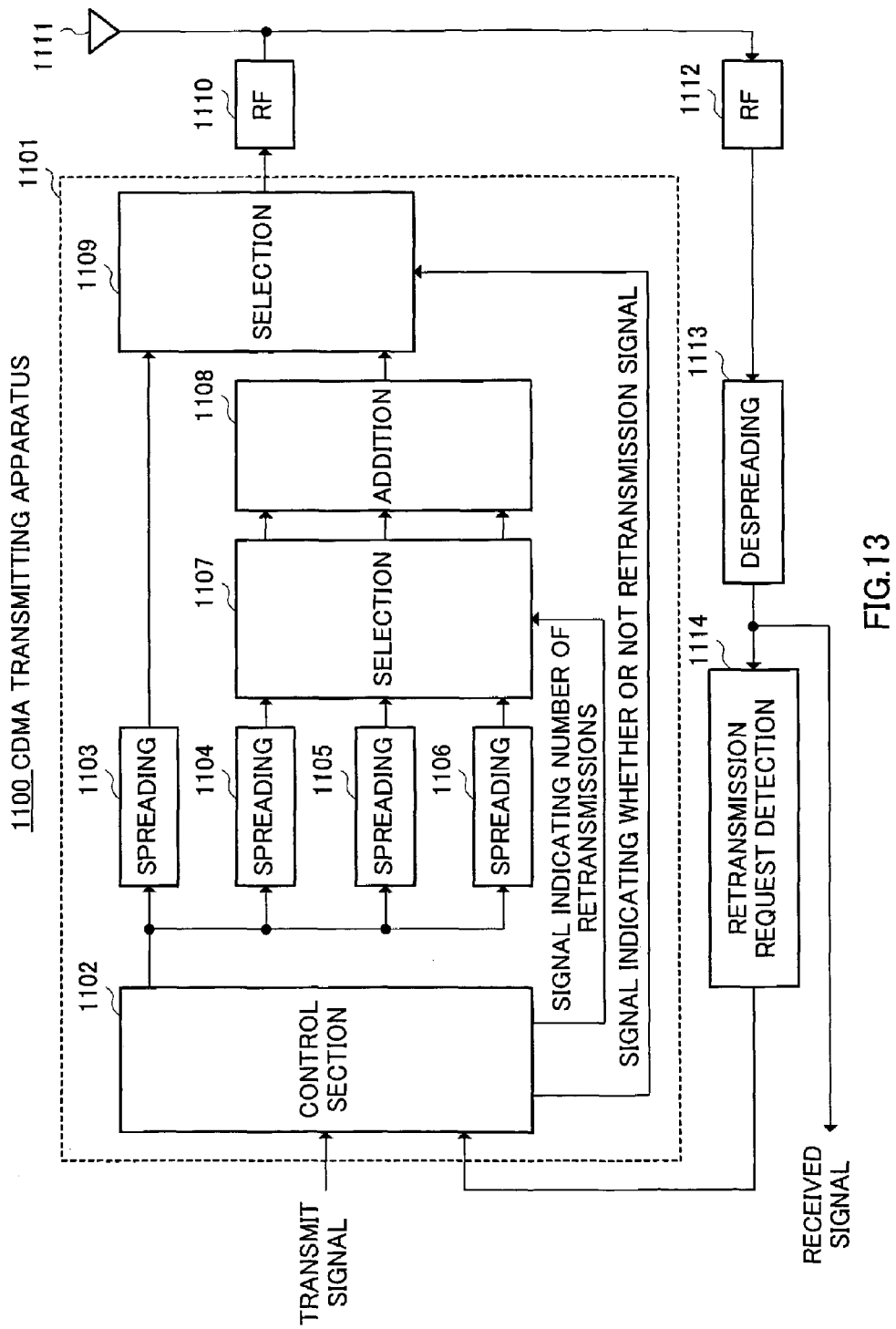
FIG. 13 is a block diagram showing the configuration of a CDMA transmitting apparatus according to Embodiment 7.
Figure 14:
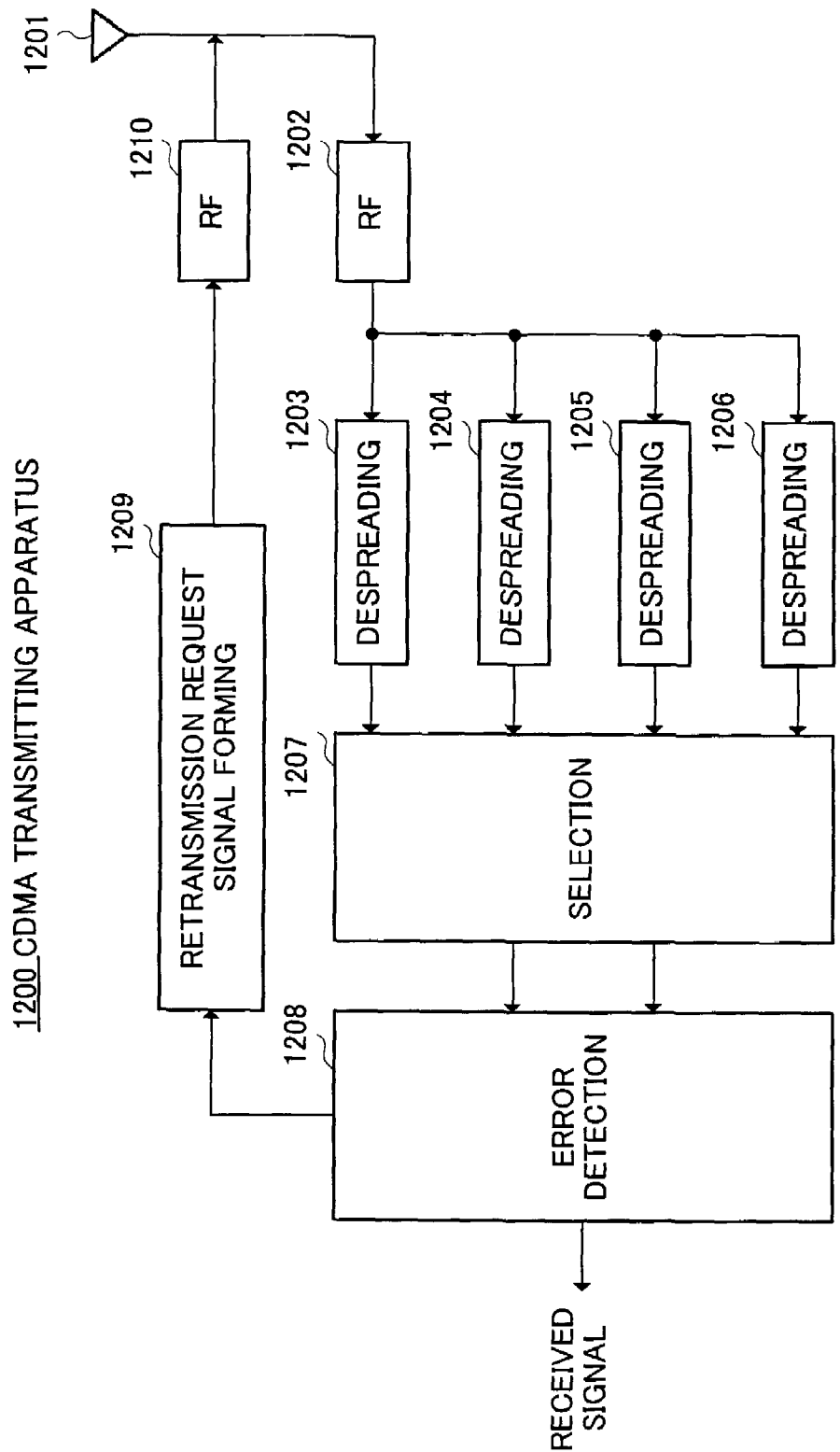
FIG. 14 is a block diagram showing the configuration of a CDMA receiving apparatus of Embodiment 7.

FIG. 13 shows the outline configuration of a CDMA transmitting apparatus 1100 according to Embodiment 7. In CDMA transmitting apparatus 1100, a modulated transmit signal is input to a control section 1102 of a code division multiplexing unit 1101. At predetermined timing, control section 1102 sends an input transmit signal to a plurality of spreading sections 1103 through 1106 that perform spreading processing using different spreading codes. Here, spreading sections 1103 through 1106 perform spreading processing using mutually orthogonal spreading codes (that is to say, spreading codes with a mutual correlation of 0).

A spread signal obtained by means of spreading section 1103 is sent to a selection section 1109, and spread signals obtained by means of spreading sections 1104, 1105, and 1106 are sent to a selection section 1107. Selection section 1107 outputs spread signals selectively based on a signal from control section 1102 indicating the number of retransmissions. Specifically, at the time of the first retransmission, only the despread signal from spreading section 1104 is selected and output, at the time of the second retransmission, despread signals from spreading section 1104 and spreading section 1105 are selected and output, and at the time of the third retransmission, despread signals from spreading sections 1104, 1105, and 1106 are selected and output.

An addition section 1108 adds spread signals output from selection section 1107. By this means a code division multiplexed signal is obtained. Selection section 1109 selectively outputs only the signal from spreading section 1103 or signals from both spreading section 1103 and addition section 1108, based on a signal from control section 1102 indicating whether or not the signal to be transmitted this time is a retransmission signal. Specifically, in the case of a first transmission, only the signal from spreading section 1103 is selected and output, and in the case of a retransmission, signals from both spreading section 1103 and addition section 1108 are selected and output.

The output from selection section 1109 is transmitted via a radio transmitting section (RF) 1110 that performs radio transmission processing such as digital-analog conversion processing and signal amplification, and an antenna 1111, provided as transmitting means.

In the receiving system of CDMA transmitting apparatus 1100, a CDMA signal received by antenna 1111 is input to a despreading section 1113 via a radio receiving section (RF) 1112 that performs radio reception processing such as analog-digital conversion processing. The signal despread by despreading section 1113 is output as a received signal, and is also sent to a retransmission request detection section 1114. Retransmission request detection section 1114 detects a retransmission request signal included in the received signal, and sends the detection result to control section 1102.

Control section 1102 is provided with a buffer, and if there is a retransmission request, the previously transmitted transmit signal stored in the buffer is output as a retransmission signal. Control section 1102 also performs control of retransmission signal transmission timing and so forth.

FIG. 9 shows the outline configuration of a radio receiving apparatus that receives a CDMA signal transmitted from CDMA transmitting apparatus 1100. In CDMA receiving apparatus 1200, a CDMA signal received by an antenna 1201 is input to a plurality of despreading sections 1203 through 1206 via a radio receiving section (RF) 1202 that performs radio reception processing such as analog-digital conversion processing. Here, despreading sections 1203, 1204, 1205, and 1206 despread the received CDMA signal using the same spreading codes as used by spreading sections 1103, 1104, 1105, and 1106, respectively, of CDMA transmitting apparatus 1100.

The despreading results obtained by means of despreading sections 1203 through 1206 are input to a selection section 1207. Selection section 1207 selects the despreading results with the greatest correlation power from among the despreading results, and sends the selected spreading results to an error detection section 1208.

Error detection section 1208 detects whether or not an error has occurred in the despreading results, and if an error is not detected, outputs the input signal as a received signal. On the other hand, if an error is detected, the fact is reported to are transmission request signal forming section 1209. To simplify the explanation, it is here assumed that an error is detected directly from despreading results, but in actuality, an error is detected after despreading results are demodulated and decoded. Retransmission request signal forming section 1209 forms a retransmission request signal when an error is detected. The retransmission request signal is transmitted to CDMA transmitting apparatus 1100 via a radio transmitting section (RF) 1210 and antenna 1201.

With the above configuration, at the time of a first transmission, in CDMA transmitting apparatus 1100 a transmit signal spread by spreading section 1103 is selected by selection section 1109 and transmitted. When CDMA receiving apparatus 1200 receives this first-time transmit signal, the result of despreading by despreading section 1203 is output to error detection section 1208, and if an error is detected by error detection section 1208, a retransmission request signal is transmitted to CDMA transmitting apparatus 1100.

At the time of a first retransmission, in CDMA transmitting apparatus 1100 only the spread signal from spreading section 1104 is selected by selection section 1107, and the spread signal from spreading section 1103 and the output from addition section 1108 are further selected by selection section 1109. As a result, a 2-code-multiplexed retransmission signal is transmitted from CDMA transmitting apparatus 1100. When CDMA receiving apparatus 1200 receives this first retransmission signal, selection section 1207 selects the despread signal with the greater correlation power from the despreading results from despreading section 1203 and despreading section 1204, and sends the selected despread signal to error detection section 1208. If an error is detected by error detection section 1208, a retransmission request signal is again transmitted to CDMA transmitting apparatus 1100.

At the time of a second retransmission, in CDMA transmitting apparatus 1100 spread signals from spreading section 1104 and spreading section 1105 are selected by selection section 1107, and the spread signal from spreading section 1103 and the output from addition section 1108 are further selected by selection section 1109. As a result, a 3-code-multiplexed retransmission signal is transmitted from CDMA transmitting apparatus 1100. When CDMA receiving apparatus 1200 receives this second retransmission signal, selection section 1207 selects the despread signal with the greatest correlation power from among the despreading results from despreading sections 1203, 1204, and 1205, and sends the selected despread signal to error detection section 1208. If an error is detected by error detection section 1208, a retransmission request signal is again transmitted to CDMA transmitting apparatus 1100.

At the time of a third retransmission, in CDMA transmitting apparatus 1100 spread signals from spreading sections 1104, 1105, and 1106 are selected by selection section 1107, and the spread signal from spreading section 1103 and the output from addition section 1108 are further selected by selection section 1109. As a result, a 4-code-multiplexed retransmission signal is transmitted from CDMA transmitting apparatus 1100. When CDMA receiving apparatus 1200 receives this third retransmission signal, selection section 1207 selects the despread signal with the greatest correlation power from among the despreading results from despreading sections 1203, 1204, 1205, and 1206.

By thus increasing the number of spreading codes assigned to a retransmission signal as the number of retransmissions increases, the error rate improvement effect can be increased as the number of retransmissions increases. As a result, the number of retransmissions can effectively be reduced without degrading error rate characteristics.

Naturally, when a plurality of spreading codes are assigned to one retransmission signal (that is, when multicode multiplexing is performed), the number of code multiplexing decreases (that is, the number of other signals that can be transmitted decreases proportionally) and therefore spectral efficiency falls. However, by increasing the number of spreading codes assigned to a transmit signal for which retransmission is performed as the number of retransmissions increases, it is possible to suppress a fall in spectral efficiency when retransmission is performed even more than when the number of spreading codes assigned is increased.

According to the above configuration, by increasing the number of spreading codes assigned to a retransmission signal as the number of retransmissions increases, it is possible to implement a CDMA transmitting apparatus 1100 that enables the number of retransmissions to be effectively reduced with almost no degradation of error rate characteristics.

In order to apply the main configuration of this embodiment to above-described Embodiments 1 through 6, the configuration of spreading sections A1 through A(5*k*) and A(5*k*+1) through A(5*k*+n) shown in FIG. 1, FIG. 3, FIG. 5, FIG. 6, FIG. 9, FIG. 10, FIG. 11, and FIG. 12, can be made as in code division multiplexing unit 1101 in FIG. 13. By this means, it is possible to obtain the effects of above-described Embodiments 1 through 6 in addition to the effect of this embodiment.

In this embodiment, a case has been described in which the correlation power of a plurality of despreading results is detected by selection section 1207, and the despreading result with the greatest correlation power is selected as a received signal, but the present invention is not limited to this, and a received signal may also be obtained by combining a plurality of despreading results.

Also, in the above embodiment, a case has been described in which 2-code-multiplexing is used at the time of a first retransmission, 3-code-multiplexing is used at the time of a second retransmission, and 4-code-multiplexing is used at the time of a third retransmission, but the present invention is not limited to this, and it is essential only that the number of code multiplexing be increased in accordance with an increase in the number of retransmissions.

Moreover, in this embodiment, a case has been described in which a number of spread signals corresponding to the number of retransmissions are selected by selection section 1107 from among a plurality of spread signals obtained by means of a plurality of spreading sections 1103 through 1106, but it is essential only that the number of code multiplexing of a transmit signal be increased as the number of retransmissions increases, and it is also possible, for example, to increase the number of spreading sections that are operated in accordance with the number of retransmissions, and multiplex the outputs thereof.

Furthermore, in this embodiment, transmission to one communicating party (user) has been described in order to simplify the explanation, but it is of course also possible to execute similar processing for signals directed to a plurality of users, and transmit these signals by code division multiplexing. In this case, for example, a number of code division multiplexing units 1101 in FIG. 13 equivalent to the number of users may be provided, and signals output from each selection section 1109 may be multiplexed and transmitted.

Embodiment 8

In this embodiment, it is proposed that the technique described in Embodiment 7 be applied to an OFDM-CDMA radio transmitting apparatus.

The OFDM-CDMA communication method here enables interference of preceding and succeeding codes in a multipath environment to be eliminated by means of a guard interval, so that when the technique of increasing the number of spreading codes assigned to a retransmission signal as the number of retransmissions increases is applied, it is possible to substantially improve error rate characteristics in a multipath environment, and to increase the effect of suppressing the number of retransmissions.

Figure 15:
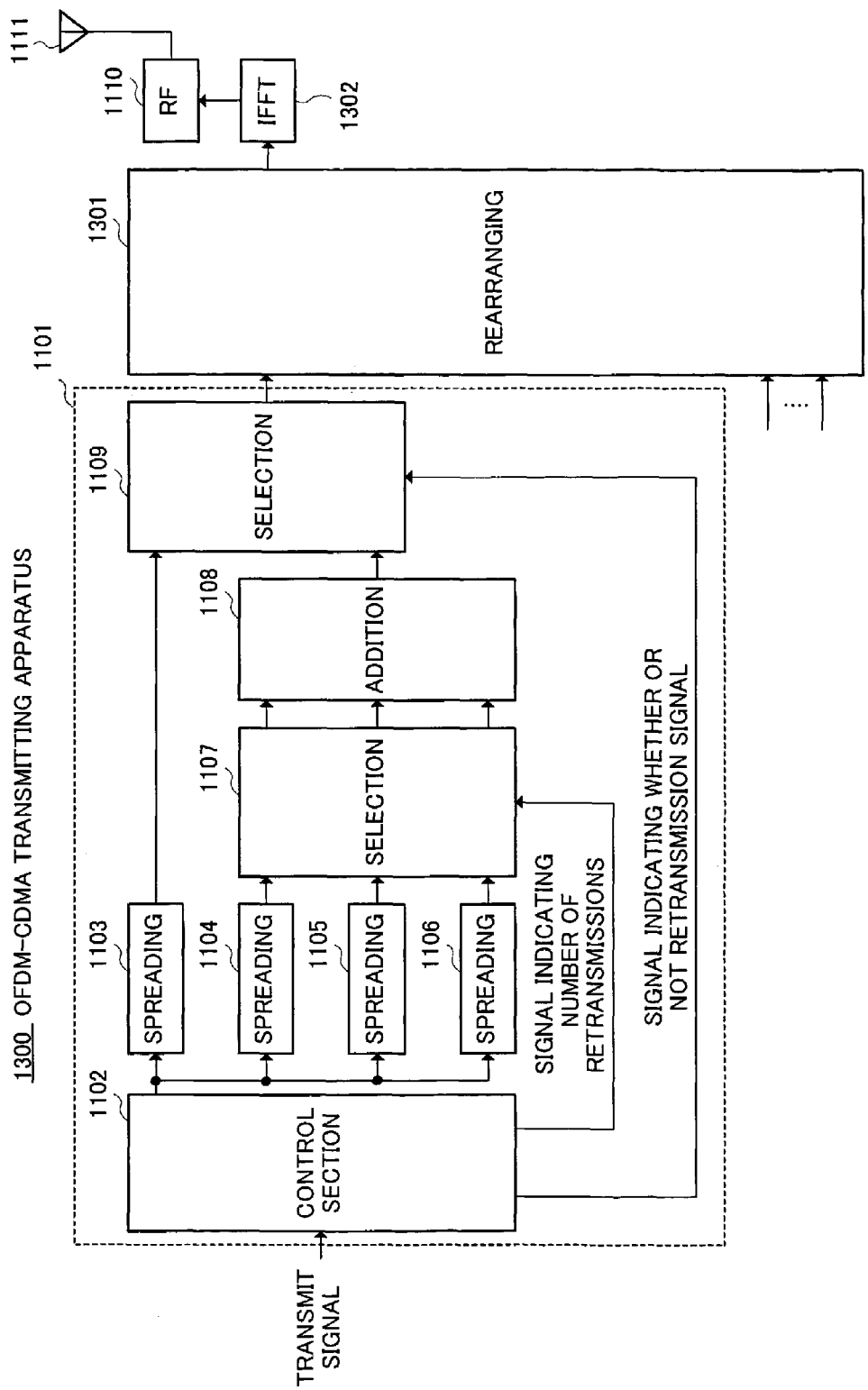
FIG. 15 is a block diagram showing the configuration of an OFDM-CDMA transmitting apparatus of Embodiment 8.

In FIG. 15, in which parts corresponding to those in FIG. 13 are assigned the same codes as in FIG. 13, an OFDM-CDMA transmitting apparatus 1300 of this embodiment has a similar configuration to CDMA transmitting apparatus 1100 in FIG. 13, except for having a rearranging section 1301 that comprises a parallel/serial conversion circuit and serial/parallel conversion circuit and rearranges a spread signal, and an inverse fast Fourier transform section (IFFT) 1302 that places spread chips on a mutually orthogonal plurality of subcarriers by executing inverse fast Fourier transform processing on a rearranged spread signal.

Spread transmit signals directed to a plurality of users are input to this rearranging section 1301. Then OFDM-CDMA transmitting apparatus 1300 can spread post-spreading chips in the frequency axis direction, in the time axis direction, or in both the frequency axis and time axis directions, according to processing by rearranging section 1301. The receiving system, not shown in FIG. 15, has a configuration that receives a retransmission request signal from a communicating party in the same way as in FIG. 13.

According to the above configuration, by increasing the number of spreading codes assigned to a retransmission signal as the number of retransmissions increases in an OFDM-CDMA transmitting apparatus 1300 that performs OFDM-CDMA communication, it is possible to implement an OFDM-CDMA transmitting apparatus 1300 that enables error rate characteristics in a multipath environment to be substantially improved, and the number of retransmissions to be substantially reduced.

If code division multiplexing unit 1101 is used for spreading sections A1 through A(5*k*) and A(5*k*+1) through A(5*k*+n) shown in FIG. 1, FIG. 3, FIG. 5, FIG. 6, FIG. 9, FIG. 10, and FIG. 11, it is possible to obtain the effects of above-described Embodiments 1 through 5 in addition to the effect of this embodiment.

Embodiment 9

In this embodiment, it is proposed that the number of spreading codes assigned to a retransmission signal be varied according to the overall transmit signal number of code multiplexing. That is to say, considering the fact that, ultimately, the number of code multiplexing for transmission by code division multiplexing is not limited to a signal directed to one user but also includes signals directed to other users, the number of spreading codes assigned to a retransmission signal is varied according to the number of code multiplexing of all of these. By this means, it is possible to substantially improve retransmission signal error rate characteristics compared with Embodiment 7, and so to substantially reduce the number of retransmissions.

Figure 16:
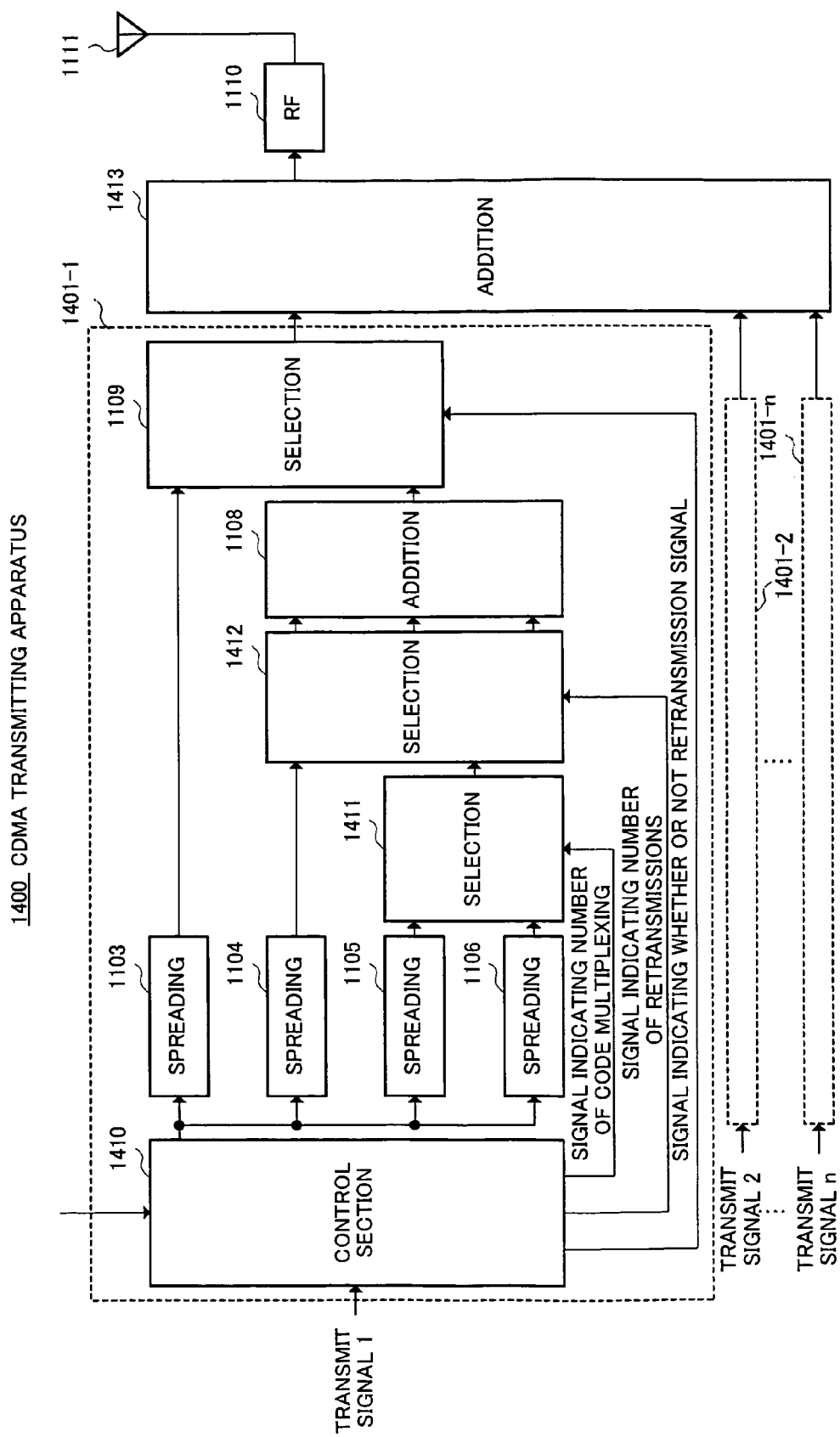
FIG. 16 is a block diagram showing the configuration of a CDMA transmitting apparatus of Embodiment 9.

In FIG. 16, in which parts corresponding to those in FIG. 13 are assigned the same codes as in FIG. 13, a CDMA transmitting apparatus 1400 of this embodiment has a number of code division multiplexing units 1401-1 through 1401-$n$ equivalent to the number of users (n). As code division multiplexing units 1401-2 through 1401-$n$ have a similar configuration to code division multiplexing unit 1401-1, the configuration of code division multiplexing unit 1401-1 will be described below.

When the number of code multiplexing is greater than or equal to a predetermined number according to the overall number of code multiplexing for transmission from CDMA transmitting apparatus 1400—that is, the number of code multiplexing equivalent to the codes added by an addition section 1413—selection section 1411 of code division multiplexing unit 1401-1 outputs only one or other of the two input spread signals. On the other hand, when the number of code multiplexing is less than the predetermined number, selection section 1411 outputs both input spread signals. The same kind of processing is also performed for the other code division multiplexing units 1401-2 through 1401-$n$. Then the outputs of selection sections 1109 provided in each of code division multiplexing units 1401-1 through 1401-$n$ are multiplexed by addition section 1413.

Control section 1410 of code division multiplexing unit 1401-1 receives as input from a higher-level control section (not shown) of CDMA transmitting apparatus 1400 a signal indicating the overall number of code multiplexing of CDMA transmitting apparatus 1400, and sends this signal to selection section 1411. The configuration of the receiving system that detects a retransmission request signal, omitted from FIG. 16 in order to simplify the diagram, is similar to that in FIG. 13.

With the above configuration, at the time of a first transmission, in CDMA transmitting apparatus 1400 a transmit signal spread by spreading section 1103 is selected by selection section 1109 and transmitted. Also, at the time of a first retransmission, only the spread signal from spreading section 1104 is selected by selection section 1412, and the spread signal from spreading section 1103 and the output from addition section 1108 are further selected by selection section 1109. As a result, a 2-code-multiplexed retransmission signal is output from selection section 1109.

At the time of a second retransmission, in CDMA transmitting apparatus 1400 spread signals from spreading section 1104 and selection section 1411 are selected by selection section 1412, and these spread signals are multiplexed by addition section 1108. If the number of code multiplexing of CDMA transmitting apparatus 1400 overall is great, one spread signal is output by selection section 1411, and if the number of code multiplexing is small, two spread signals are output, as a result of which two or three spread signals are multiplexed by addition section 1412. As a result, a 3-code- or 4-code-multiplexed retransmission signal is output from selection section 1109.

At the time of a third retransmission, in CDMA transmitting apparatus 1400 spread signals from spreading section 1104 and selection section 1411 are selected by selection section 1412, and these spread signals are multiplexed by addition section 1108. If the number of code multiplexing of CDMA transmitting apparatus 1400 overall is great, one spread signal is output by selection section 1411, and if the number of code multiplexing is small, two spread signals are output, as a result of which two or three spread signals are multiplexed by addition section 1412. As a result, a 3-code- or 4-code-multiplexed retransmission signal is output from selection section 1109.

By thus having CDMA transmitting apparatus 1400 not simply increase the number of spreading codes assigned to a retransmission signal as the number of retransmissions increases, but also consider the overall number of code multiplexing including spread signals directed to other users code division multiplexed together with that retransmission signal, in deciding the number of spreading codes to be assigned to a retransmission signal, it is possible to substantially improve retransmission signal error rate characteristics, and substantially reduce the number of retransmissions.

Certainly, considering that the number of spreading codes assigned to one retransmission signal is increased, a plurality of spread signals are formed for one retransmission signal and these are multiplexed and transmitted, and signals with the largest correlation power are selected or combined on the receiving side, it can be expected that error rate characteristics will improve proportionally as more spreading codes are assigned to a retransmission signal.

However, when the number of code multiplexing is great, associated inter-code interference also increases, and therefore error rate characteristics may actually degrade. In the case of multipath propagation, in particular, orthogonality between spreading codes is lost, and therefore error rate characteristics degrade if the number of code multiplexing is too great.

In this embodiment, by deciding the number of spreading codes to be assigned to a retransmission signal in a range within which the overall transmit signal number of code multiplexing does not exceed a predetermined value, inter-code interference can be suppressed, error rate characteristics can be substantially improved, and the number of retransmissions can be substantially reduced.

According to the above configuration, by varying the number of spreading codes assigned to a retransmission signal according to the number of code multiplexing, it is possible to implement a CDMA transmitting apparatus 1400 that enables retransmission signal error rate characteristics to be substantially improved compared with Embodiment 7, thereby enabling the number of retransmissions to be substantially reduced.

In order to apply the main configuration of this embodiment to above-described Embodiments 1 through 6, the configuration of spreading sections A1 through A($5k$) and A($5k$+1) through A($5k$+n) shown in FIG. 1, FIG. 3, FIG. 5, FIG. 6, FIG. 9, FIG. 10, FIG. 11, and FIG. 12, can be made as in code division multiplexing unit 1401 in FIG. 16. By this means, it is possible to obtain the effects of above-described Embodiments 1 through 6 in addition to the effect of this embodiment.

In this embodiment, a case has been described in which 2-code-multiplexing is used at the time of a first retransmission, 3-code-multiplexing is used at the time of a second retransmission, and 4-code-multiplexing is used at the time of a third retransmission, but these are only examples, and the numbers of code multiplexing are not limited to these.

Also, in this embodiment, a case has been described in which the present invention is applied to a CDMA transmitting apparatus 1400 using the CDMA communication method, but the present invention may also be applied to a radio transmitting apparatus using the OFDM-CDMA communication method. In this case, a rearranging section comprising a parallel/serial conversion section and serial/parallel conversion section may be provided instead of addition section 1413, and inverse Fourier transform processing may be performed on a rearranged signal.

Embodiment 10

In this embodiment, it is proposed that, in addition to providing the configuration of Embodiment 7 or Embodiment 9, the transmission power of a retransmission signal be increased as the number of retransmissions increases. By this means, it is possible to substantially improve retransmission signal error rate characteristics compared with Embodiment 7 or Embodiment 9, and so substantially reduce the number of retransmissions.

Figure 17:
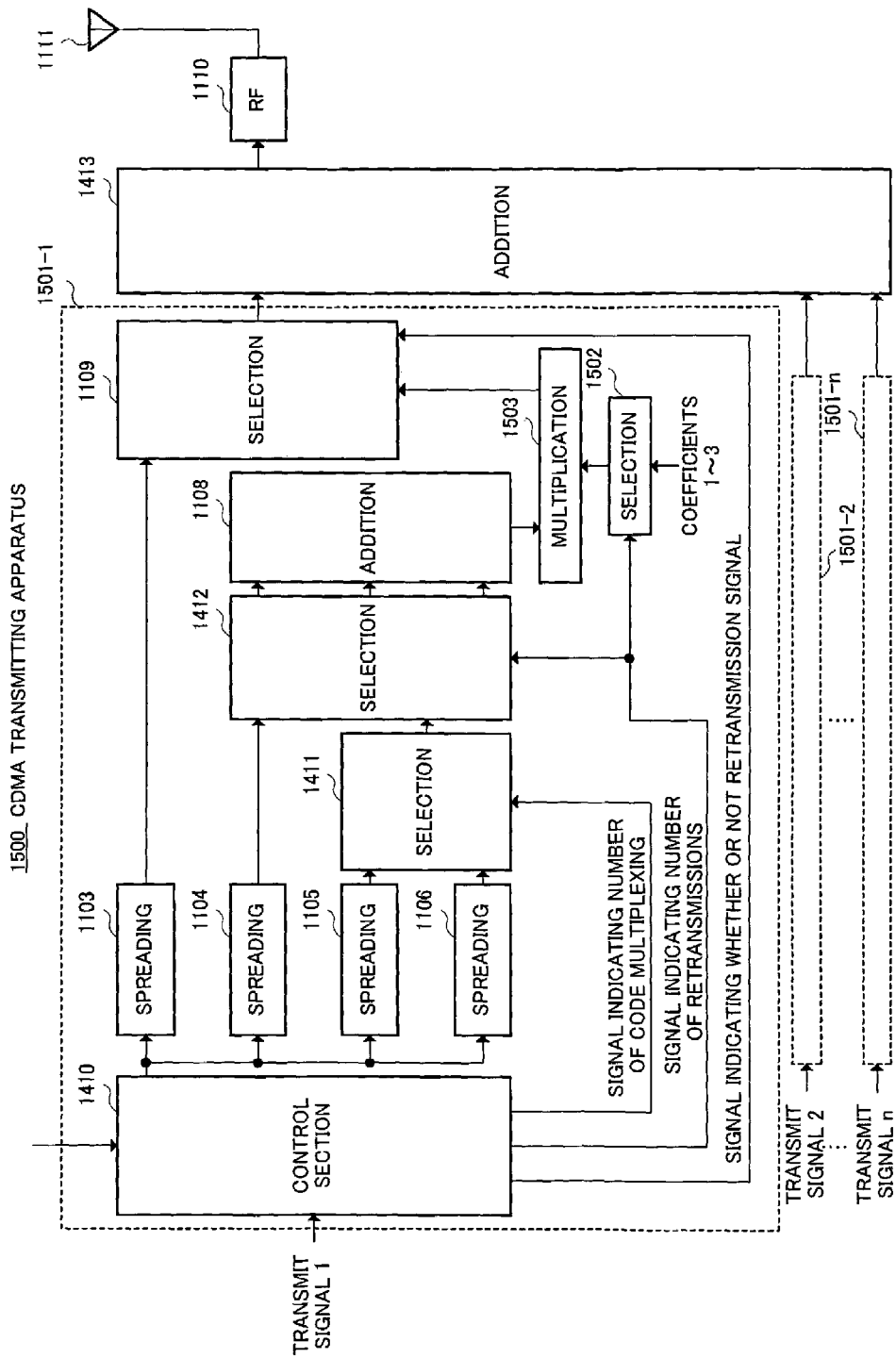
FIG. 17 is a block diagram showing the configuration of a CDMA transmitting apparatus of Embodiment 10.

In FIG. 17, in which parts corresponding to those in FIG. 16 are assigned the same codes as in FIG. 16, code division multiplexing unit 1501-1 of CDMA transmitting apparatus 1500 of this embodiment has a similar configuration to that of CDMA transmitting apparatus 1400 in FIG. 16, except for having a multiplication section 1503 as a transmission power control section downstream of addition section 1108, and a selection section 1502 for selecting a multiplication coefficient for multiplication by multiplication section 1503.

Selection section 1502 selects a coefficient in accordance with a signal from control section 1410 indicating the number of retransmissions. Specifically, selection section 1502 selects "1" as a coefficient at the time of a first retransmission, selects "2" as a coefficient at the time of a second retransmission, and selects "3" as a coefficient at the time of a third retransmission. As a result, at the time of a first retransmission the signal from addition section 1108 is output at its original signal level from multiplication section 1503, at the time of a second retransmission the signal from addition section 1108 is output with its signal level doubled from multiplication section 1503, and at the time of a third retransmission the signal from addition section 1108 is output with its signal level tripled from multiplication section 1503.

Thus, in CDMA transmitting apparatus 1500, as the number of retransmissions increases, the number of spreading codes assigned to a retransmission signal is increased and retransmission signal transmission power is also increased. Specifically, at the time of initial transmission, transmission is performed at the same transmission power as signals directed to other users; at the time of a first retransmission, transmission is performed at twice the transmission power of signals directed to other users; at the time of a second retransmission, transmission is performed at three times the transmission power of signals directed to other users; and at the time of a third retransmission, transmission is performed at four times the transmission power of signals directed to other users.

According to the above configuration, by increasing the transmission power of a retransmission signal as the number of retransmissions increases in addition to increasing the number of spreading codes assigned to a retransmission signal as the number of retransmissions increases, it is possible to implement a CDMA transmitting apparatus 1500 that enables retransmission signal error rate characteristics to be substantially improved, and thus enables the number of retransmissions to be substantially reduced.

The transmission power set values described in this embodiment are only examples, and the present invention is not limited to these, it being essential only that the transmission power of a retransmission signal be increased as the number of retransmissions increases.

Furthermore, a method is also effective whereby the transmission power of a retransmission signal is varied according to the overall number of code multiplexing in transmission from a CDMA transmitting apparatus. Specifically, since the number of code multiplexing is naturally small when the number of users is small, in this case, quality can be improved for users for whom retransmission is performed by further increasing the transmission power of a retransmission signal.

Also, in above Embodiments 7, 9, and 10, a CDMA transmitting apparatus has mainly been described, but similar effects to those in Embodiments 7, 9, and 10 can also be obtained when the configurations of Embodiments 7, 9, and 10 are applied to an OFDM-CDMA transmitting apparatus.

In addition, in OFDM-CDMA radio transmission, a spread signal is distributed among a plurality of subcarriers, allowing a greater number of freedom in spread signal arrangement than in the case of CDMA. For example, it is possible to set time-domain spreading whereby a spread signal is arranged in the time direction of the same subcarrier, frequency-domain spreading whereby a spread signal is arranged on different subcarriers (that is, is arranged in the frequency direction), or two-dimensional spreading whereby a spread signal is arranged in both the time direction and the frequency direction.

Thus, when the configuration of Embodiment 7, 9, or 10 is applied to an OFDM-CDMA transmitting apparatus, and the number of spreading codes assigned to a retransmission signal is increased as the number of retransmissions increases, a spread signal can be transmitted arranged with a number of freedom on a plurality of subcarriers, enabling transmission to be performed with a spread signal accommodated efficiently in a plurality of subcarriers even when the number of chips increases, for instance.

Other Embodiments

In above Embodiments 1 through 6, a case has been described in which the number of multiplexing of specific symbols is reduced and/or the spreading ratio is increased, but the present invention is not limited to this, and if the modulation M-ary number of specific symbols is made smaller than the modulation M-ary number of other symbols, error rate characteristics can be substantially improved without degrading spectral efficiency too much. That is to say, if modulation processing for specific symbols is performed by means of QPSK while modulation processing for other symbols is performed by means of 16-value QAM, error rate characteristics are substantially improved since QPSK has better error rate characteristics than 16-value QAM.

Also, in above Embodiments 1 through 6, control information and retransmission information have been quoted as examples of specific symbols whose number of multiplexing is reduced or spreading ratio is increased, but the present invention is not limited to this, and a propagation path estimation preamble may also be selected as a specific symbol. That is to say, if the number of code multiplexing of a propagation path estimation preamble is made smaller and/or the spreading ratio made larger, and insertion in a transmit signal is performed periodically, a propagation path estimation preamble can be transmitted with good quality, and therefore high-precision propagation path estimation can be performed by updating propagation path estimation results using that propagation path estimation preamble in propagation path compensation section 303 shown in FIG. 7, for example.

Also, with the present invention, with regard to the number of multiplexing of specific symbols, it is sufficient to make the number of multiplexing smaller than that of other symbols, and there is no particular limitation on that number of multiplexing, but if the number of multiplexing is made "1", transmission can be performed without receiving any inter-code interference whatever. That is to say, within specific symbols, "1" may be selected as the number of multiplexing for transmitting particularly important symbols.

Similarly, with the present invention, with regard to the spreading ratio of specific symbols, it is sufficient to make the spreading ratio larger than that of other symbols and there is no particular limitation on the value of that spreading ratio, and the spreading ratio of specific symbols may be made "1". As making the spreading ratio "1" here means not spreading, in the case of the OFDM-CDMA method, specific symbols can be transmitted using the OFDM method. By this means, specific symbols can be transmitted with good quality and at high speed.

In the above embodiments, also, a case has been described in which, when multiplexed spread signals are distributed among a plurality of mutually orthogonal subcarriers by an orthogonal frequency division multiplexing section, they are distributed among frequency axis direction subcarriers, or frequency axis direction subcarriers and time axis direction subcarriers (two-dimensional spreading), but the present invention is not limited to this, and chips of specific symbols whose number of multiplexing has been reduced or spreading ratio has been increased may also be distributed among only time axis direction subcarriers.

By so doing, if, for example, a subcarrier is detected for which there is little decrease in reception level due to frequency selective fading, and such a subcarrier is selected for time axis direction spreading, the error rate characteristics of specific symbols can be substantially improved. This method is suitable for cases where the speed of movement of a communication terminal is low and there is little fading time fluctuation.

The present invention is not limited to the above-described embodiments, and various variations and modifications may be possible without departing from the scope of the present invention.

An OFDM-CDMA transmitting apparatus of the present invention has a configuration comprising a spreading section that spreads transmit symbols, a number of multiplexing selection section that selects the number of multiplexing for each transmit symbol, a multiplexing section that multiplexes a spread signal of each transmit symbol using the selected number of multiplexing, and an orthogonal frequency division multiplexing section that distributes a multiplexed spread signal among a plurality of subcarriers.

According to this configuration, by having the number of multiplexing of each transmit symbol selected by the number of multiplexing selection section, it is possible to select inter-code interference in code division multiplexed signal transmission on a symbol-by-symbol basis, enabling error rate characteristic quality to be selected on a symbol-by-symbol basis. As a result, if a symbol for which the number of multiplexing is reduced and error rate characteristics are made good is selected as appropriate, error rate characteristics can be improved without degrading frequency characteristics so much.

An OFDM-CDMA transmitting apparatus of the present invention has a configuration comprising a spreading section that selects a spreading ratio for each transmit symbol and spreads transmit symbols, a multiplexing section that multiplexes a spread signal of each transmit symbol, and an orthogonal frequency division multiplexing section that distributes a multiplexed spread signal among a plurality of subcarriers.

According to this configuration, the spreading ratio of each spread signal that forms a code division multiplexed signal is selected on a symbol-by-symbol basis, enabling error rate characteristic quality to be selected on a symbol-by-symbol basis. As a result, if a symbol for which the spreading ratio is increased and error rate characteristics are made good is selected as appropriate, error rate characteristics can be improved without degrading frequency characteristics so much.

An OFDM-CDMA transmitting apparatus of the present invention has a configuration whereby a specific symbol whose number of multiplexing has been reduced or a specific symbol whose spreading ratio has been increased is placed at the start of a frame.

According to this configuration, when frame synchronization is performed on the receiving side based on a specific symbol at the start of a frame, a specific symbol for frame synchronization can be transmitted with good quality, enabling the transmission target to perform frame synchronization processing with a high number of precision.

An OFDM-CDMA transmitting apparatus of the present invention has a configuration whereby the number of multiplexing of a retransmission symbol is reduced in accordance as the number of retransmissions increases or the spreading ratio for a retransmission symbol is increased in accordance as the number of retransmissions increases.

According to this configuration, it is possible to prevent the number of retransmissions from becoming large in a state in which degradation of spectral efficiency (the overall amount of transmitted data) is suppressed. As a result, the real amount of transmitted data can be increased.

An OFDM-CDMA transmitting apparatus of the present invention has a configuration whereby the modulation M-ary number of a specific symbol whose number of multiplexing has been reduced or a specific symbol whose spreading ratio has been increased is made smaller than the modulation M-ary number of other transmit symbols.

According to this configuration, error rate characteristics of specific symbols can be substantially improved without degrading spectral efficiency too much.

An OFDM-CDMA transmitting apparatus of the present invention has a configuration whereby a specific symbol whose number of multiplexing has been reduced or a specific symbol whose spreading ratio has been increased is inserted periodically.

An OFDM-CDMA receiving apparatus of the present invention receives and demodulates a signal transmitted from an above-described OFDM-CDMA transmitting apparatus, and has a configuration whereby propagation path estimation result updating is performed using a periodically inserted specific symbol whose number of multiplexing has been reduced or specific symbol whose spreading ratio has been increased.

According to these configurations, by inserting a specific signal into a transmit signal periodically and using this specific symbol as a propagation path estimation preamble, the number of code multiplexing of the propagation path estimation preamble is reduced or the spreading ratio of the propagation path estimation preamble is increased, enabling the propagation path estimation preamble to be transmitted with good quality. As a result, propagation path estimation can be performed with a high number of precision using a propagation path estimation preamble.

An OFDM-CDMA transmitting apparatus of the present invention has a configuration whereby the number of multiplexing of a specific symbol whose number of multiplexing has been reduced is made "1".

According to this configuration, a specific symbol whose number of multiplexing is made "1" is transmitted without receiving any inter-code interference whatever. Therefore, if particularly important symbols among specific symbols are transmitted with "1" selected as the number of multiplexing, the error rate characteristics of particularly important symbols can be substantially improved.

An OFDM-CDMA transmitting apparatus of the present invention has a configuration wherein the spreading section uses "1" as the spreading ratio of a specific symbol whose number of multiplexing has been reduced.

According to this configuration, since making the spreading ratio "1" means not spreading, specific symbols can be transmitted at high speed. Thus, specific symbols can be transmitted with good quality and at high speed.

An OFDM-CDMA transmitting apparatus of the present invention has a configuration wherein the orthogonal frequency division multiplexing section distributes chips of a specific symbol whose number of multiplexing has been reduced or spreading ratio has been increased only in the time axis direction.

According to this configuration, if, for example, a subcarrier is detected for which there is little decrease in reception level due to frequency selective fading, and such a subcarrier is selected for time direction spreading, the error rate characteristics of specific symbols can be substantially improved. This method is particularly suitable for cases where there is little fading time fluctuation.

An OFDM-CDMA transmitting apparatus of the present invention has a configuration wherein the spreading section increases the number of spreading codes assigned to a retransmission signal as the number of retransmissions increases and performs multicode multiplexing of a retransmission signal.

According to this configuration, a retransmission signal is transmitted code division multiplexed (multicode-multiplexed) using a plurality of spreading codes, so that retransmission signal error rate characteristics are improved on the receiving side by despreading this code division multiplexed signal using the same plurality of spreading codes as on the transmitting side, and selecting or combining despreading results with the greatest correlation power thereamong. Also, since the number of code multiplexing is increased proportionally as the number of retransmissions increases, retransmission signal error rate characteristics can be improved without lowering spectral efficiency unnecessarily. As a result, the number of retransmissions can be effectively reduced with almost no degradation of the error rate.

An OFDM-CDMA transmitting apparatus of the present invention has a configuration wherein the spreading section varies the number of spreading codes assigned to a retransmission signal in accordance with the number of other code division multiplexed signals multiplexed in a retransmission signal after multicode multiplexing.

According to this configuration, the number of code multiplexing of all signals transmitted, including code division multiplexed signals directed to other users, is considered in deciding the number of spreading codes to be assigned to a retransmission signal, thereby enabling inter-code interference to be suppressed. As a result, it is possible to substantially improve retransmission signal error rate characteristics, and substantially reduce the number of retransmissions.

An OFDM-CDMA transmitting apparatus of the present invention has a configuration further comprising a transmission power control section that increases the transmission power of a multicode-multiplexed retransmission signal as the number of retransmissions increases.

According to this configuration, retransmission signal error rate characteristics can be improved proportionally as the number of retransmissions increases, enabling the number of retransmissions to be substantially reduced. It is also possible to prevent interference being imposed on other signals unnecessarily to a greater number than when transmission power is controlled at a high level from the time when the number of retransmissions is small.

An OFDM-CDMA transmitting apparatus of the present invention has a configuration wherein the transmission power control section varies transmission power in accordance with the number of other code division multiplexed signals multiplexed in a retransmission signal after multicode multiplexing.

According to this configuration, if, for example, transmission power is increased when the number of other code division multiplexed signals is small, and not increased when the number of other code division multiplexed signals is large, the effect on other signals can be substantially reduced, and retransmission signal error rate characteristics can be effectively improved.

As described above, according to the present invention, by selecting the number of multiplexing (that is, the number of code multiplexing) on a symbol-by-symbol basis, and/or selecting the spreading ratio on a symbol-by-symbol basis, it is possible to provide an OFDM-CDMA or CDMA radio transmitting apparatus and radio transmitting method that make it possible to achieve compatibility between spectral efficiency and error rate characteristics.

Also, by increasing the number of spreading codes assigned to a retransmission signal as the number of retransmissions increases, the number of retransmissions can be effectively reduced with almost no degradation of the error rate.

This application is based on Japanese Patent Application No. 2002-244310 filed on Aug. 23, 2002, and Japanese Patent Application No. 2002-244309 filed on Aug. 23, 2002, entire content of which is expressly incorporated by reference herein.

INDUSTRIAL APPLICABILITY

The present invention is applicable to an OFDM-CDMA or CDMA radio communication apparatus for which both an improvement in spectral efficiency and an improvement in error rate characteristics are required.

The invention claimed is:

1. An OFDM-CDMA transmitting apparatus comprising:
a spreading section that spreads transmit symbols and makes a spreading ratio of a specific transmit symbol larger than a spreading ratio of other transmit symbols;
a number of multiplexing selection section that selects a number of multiplexing for each transmit symbol and makes a number of multiplexing for the specific transmit symbol smaller than a number of multiplexing for the other transmit symbols;
a multiplexing section that multiplexes spread signals of said each transmit symbol by the selected number of multiplexing; and
an orthogonal frequency division multiplexing section that distributes the multiplexed spread signals to a plurality of subcarriers and distributes at least one of chips of the specific transmit symbol whose number of multiplexing has been reduced and chips of the specific transmit symbol whose spreading ratio has been increased, only to subcarriers in a time domain, among subcarriers in a frequency domain, subcarriers in the frequency domain and the time domain, and the subcarriers in the time domain, without widening a frequency band.

2. The OFDM-CDMA transmitting apparatus according to claim 1, wherein data for which better channel quality is required than for other data is allocated to the specific transmit symbol whose number of multiplexing has been reduced.

3. The OFDM-CDMA transmitting apparatus according to claim 1, wherein data for which better channel quality is required than for other data is allocated to the specific transmit symbol whose spreading ratio has been increased.

4. The OFDM-CDMA transmitting apparatus according to claim 1, wherein the specific transmit symbol whose number of multiplexing has been reduced is placed at a start of a frame.

5. The OFDM-CDMA transmitting apparatus according to claim 1, wherein the specific transmit symbol whose spreading ratio has been increased is placed at a start of a frame.

6. The OFDM-CDMA transmitting apparatus according to claim 1, wherein the number of multiplexing selection section reduces a number of multiplexing of a retransmission symbol in accordance with an increase of a number of retransmissions.

7. The OFDM-CDMA transmitting apparatus according to claim 1, wherein the spreading section increases a spreading ratio of a retransmission symbol in accordance with an increase of a number of retransmissions.

8. The OFDM-CDMA transmitting apparatus according to claim 1, wherein an M-ary modulation number of the specific transmit symbol whose number of multiplexing has been reduced is made smaller than an M-ary modulation number of the other transmit symbols.

9. The OFDM-CDMA transmitting apparatus according to claim 1, wherein an M-ary modulation number of the specific transmit symbol whose spreading ratio has been increased is made smaller than an M-ary modulation number of the other transmit symbols.

10. The OFDM-CDMA transmitting apparatus according to claim 1, wherein the specific transmit symbol whose number of multiplexing has been reduced is inserted periodically.

11. The OFDM-CDMA transmitting apparatus according to claim 1, wherein the specific transmit symbol whose spreading ratio has been increased is inserted periodically.

12. The OFDM-CDMA transmitting apparatus according to claim 1, wherein the number of multiplexing of the specific transmit symbol whose number of multiplexing has been reduced is made "1".

13. The OFDM-CDMA transmitting apparatus according to claim 1, wherein the spreading section makes the spreading ratio of the specific transmit symbol whose number of multiplexing has been reduced is made "1".

14. The OFDM-CDMA transmitting apparatus according to claim 1, wherein the orthogonal frequency division multiplexing section distributes the specific transmit symbol, which requires better quality than the other transmit symbols, to the subcarriers in the time domain.

\* \* \* \* \*